US012615306B2

(12) United States Patent
Pezeshki et al.

(10) Patent No.: US 12,615,306 B2
(45) Date of Patent: *Apr. 28, 2026

(54) METHODS AND APPARATUS FOR ASYNCHRONOUS MEDIA REQUESTS

(71) Applicant: DIRECTV, LLC, El Segundo, CA (US)

(72) Inventors: Reza Pezeshki, Chevy Chase, MD (US); Richard Tatem, Middletown, MD (US); Horia-Mihai Popa, Iasi (RO); Wassim Daccache, Ellicott City, MD (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/408,345

(22) Filed: Jan. 9, 2024

(65) Prior Publication Data

US 2024/0364769 A1      Oct. 31, 2024

Related U.S. Application Data

(63) Continuation of application No. 18/309,658, filed on Apr. 28, 2023, now Pat. No. 12,034,790.

(51) Int. Cl.
*H04L 65/70* (2022.01)
*H04L 65/611* (2022.01)

(52) U.S. Cl.
CPC ............ *H04L 65/70* (2022.05); *H04L 65/611* (2022.05)

(58) Field of Classification Search
CPC .......... H04N 21/44004; H04N 21/2401; H04L 65/70; H04L 6/611
See application file for complete search history.

(56) References Cited

U.S. PATENT DOCUMENTS

| | | | |
|---|---|---|---|
| 7,082,142 | B1 | 7/2006 | Begeja |
| 7,448,047 | B2 | 11/2008 | Poole et al. |

(Continued)

FOREIGN PATENT DOCUMENTS

| | | |
|---|---|---|
| CN | 112272115 A | 1/2021 |
| CN | 112511565 B | 5/2021 |

(Continued)

OTHER PUBLICATIONS

United States Patent and Trademark Office, "Non-Final Office Action," issued in connection with U.S. Appl. No. 17/478,291, dated Sep. 8, 2022, 10 pages.

(Continued)

*Primary Examiner* — Jerry B Dennison
(74) *Attorney, Agent, or Firm* — Hanley, Flight & Zimmerman, LLC

(57) ABSTRACT

Systems, apparatus, articles of manufacture, and methods are disclosed. An example system of client devices, includes a first client device comprising: programmable circuitry; a memory that stores executable instructions that, when executed or instantiated by the programmable circuitry, facilitate performance of operations including: receiving a datagram using User Datagram Protocol (UDP) from a server device, the datagram corresponding to a media segment of a media stream; after receiving the datagram, transmitting a Hypertext Transfer Protocol (HTTP) communication including a request for the media segment; and responsive to transmitting the HTTP communication, receiving metadata corresponding to the media segment from the server device.

20 Claims, 13 Drawing Sheets

(56) References Cited

U.S. PATENT DOCUMENTS

| | | | |
|---|---|---|---|
| 7,843,952 B2 | 11/2010 | Roe et al. | |
| 7,961,705 B2 | 6/2011 | Kennedy et al. | |
| 9,094,578 B2 | 7/2015 | Newell | |
| 9,407,687 B2 | 8/2016 | Long | |
| 9,420,026 B2 | 8/2016 | Baldwin et al. | |
| 9,438,661 B2 | 9/2016 | Glasser et al. | |
| 9,537,902 B2 | 1/2017 | Barone et al. | |
| 9,767,040 B2 | 9/2017 | Pradeep et al. | |
| 10,237,315 B2 | 3/2019 | Baldwin | |
| 10,430,560 B2 | 10/2019 | Baldwin et al. | |
| 10,693,932 B2 | 6/2020 | Baldwin | |
| 10,749,925 B1 | 8/2020 | Hudgin et al. | |
| 11,196,793 B2 * | 12/2021 | Kim | H04L 65/70 |
| 11,412,018 B2 | 8/2022 | Baldwin et al. | |
| 12,034,790 B1 * | 7/2024 | Pezeshki | H04L 65/70 |
| 12,132,948 B2 | 10/2024 | Wang et al. | |
| 2001/0039659 A1 | 11/2001 | Simmons et al. | |
| 2002/0016776 A1 | 2/2002 | Chu et al. | |
| 2002/0059144 A1 | 5/2002 | Meffert et al. | |
| 2003/0037261 A1 | 2/2003 | Meffert et al. | |
| 2005/0060584 A1 | 3/2005 | Ginter et al. | |
| 2005/0138357 A1 | 6/2005 | Swenson et al. | |
| 2005/0198322 A1 | 9/2005 | Takabayashi et al. | |
| 2006/0280303 A1 | 12/2006 | Gupte | |
| 2007/0083667 A1 | 4/2007 | Cooper | |
| 2007/0258363 A1 | 11/2007 | Wu et al. | |
| 2008/0086779 A1 | 4/2008 | Blake et al. | |
| 2008/0294446 A1 * | 11/2008 | Guo | G10L 19/167 704/E19.048 |
| 2009/0150982 A1 | 6/2009 | Kim | |
| 2010/0074230 A1 * | 3/2010 | Ishii | H04W 72/20 370/336 |
| 2012/0166628 A1 | 6/2012 | Kullos | |
| 2012/0324519 A1 | 12/2012 | Laughlin | |
| 2013/0128889 A1 | 5/2013 | Mathur et al. | |
| 2013/0346564 A1 | 12/2013 | Warrick et al. | |
| 2014/0059168 A1 * | 2/2014 | Ponec | H04L 65/1101 709/217 |
| 2015/0032851 A1 * | 1/2015 | Lieber | H04L 65/762 709/219 |
| 2015/0288617 A1 | 10/2015 | Dasher et al. | |
| 2015/0288732 A1 | 10/2015 | Phillips et al. | |
| 2015/0304445 A1 | 10/2015 | Sahar et al. | |
| 2016/0277522 A1 * | 9/2016 | Singh | H04W 4/80 |
| 2017/0171580 A1 | 6/2017 | Hirsch et al. | |
| 2017/0188054 A1 | 6/2017 | Ma et al. | |
| 2018/0184145 A1 | 6/2018 | Pichon et al. | |
| 2018/0316740 A1 * | 11/2018 | Stockhammer | H04N 21/44004 |
| 2018/0373847 A1 | 12/2018 | Lo et al. | |
| 2019/0140884 A1 | 5/2019 | Liu et al. | |
| 2019/0141383 A1 | 5/2019 | Kageyama et al. | |
| 2020/0059683 A1 | 2/2020 | Grigsby et al. | |
| 2023/0034793 A1 | 2/2023 | Pezeshki et al. | |
| 2023/0088143 A1 | 3/2023 | Wang et al. | |
| 2024/0364769 A1 * | 10/2024 | Pezeshki | H04L 65/65 |
| 2024/0430507 A1 | 12/2024 | Wang et al. | |

FOREIGN PATENT DOCUMENTS

| | | |
|---|---|---|
| CN | 114666640 A | 6/2022 |
| WO | 02033558 A1 | 4/2002 |

OTHER PUBLICATIONS

United States Patent and Trademark Office, "Non-Final Office Action," issued in connection with U.S. Appl. No. 17/388,486, dated Sep. 27, 2022, 15 pages.

United States Patent and Trademark Office, "Final Office Action," issued in connection with U.S. Appl. No. 17/478,291, dated Feb. 23, 2023, 12 pages.

United States Patent and Trademark Office, "Final Office Action," issued in connection with U.S. Appl. No. 17/388,486, dated Mar. 29, 2023, 20 pages.

United States Patent and Trademark Office, "Non-Final Office Action," issued in connection with U.S. Appl. No. 17/478,291, dated Jul. 13, 2023, 11 pages.

United States Patent and Trademark Office, "Notice of Allowance and Fee(s) Due," issued in connection with U.S. Appl. No. 18/309,658, dated Oct. 10, 2023, 8 pages.

United States Patent and Trademark Office, "Final Office Action," issued in connection with U.S. Appl. No. 17/478,291, dated Jan. 26, 2024, 11 pages.

United States Patent and Trademark Office, "Notice of Allowance and Fee(s) Due," issued in connection with U.S. Appl. No. 18/309,658, dated Mar. 5, 2024, 8 pages.

United States Patent and Trademark Office, "Notice of Allowance and Fee(s) Due," issued in connection with U.S. Appl. No. 17/478,291, dated Jun. 11, 2024, 8 pages.

* cited by examiner

METHODS AND APPARATUS FOR ASYNCHRONOUS MEDIA REQUESTS

RELATED APPLICATION

This patent arises from a continuation of U.S. patent application Ser. No. 18/309,658 (now U.S. Pat. No. 12,034, 790), which was filed on Apr. 28, 2023. U.S. patent application Ser. No. 18/309,658 is hereby incorporated herein by reference in its entirety. Priority to U.S. patent application Ser. No. 18/309,658 is hereby claimed.

FIELD OF THE DISCLOSURE

This disclosure relates generally to multicasting media and, more particularly, to methods and apparatus for asynchronous media requests.

BACKGROUND

In recent years, the number of devices within a given location that support media playback has increased. Conventionally, delivery of media content to multiple devices utilized a unicast protocol in which a content delivery network supports n different transmissions of the same media from a content provider to n different devices. In unicast systems, separate copies of the media content are delivered to each of the n different devices as a HTTP stream.

BRIEF DESCRIPTION OF THE DRAWINGS

In general, the same reference numbers will be used throughout the drawing(s) and accompanying written description to refer to the same or like parts. The figures are not necessarily to scale.

Figure 1:
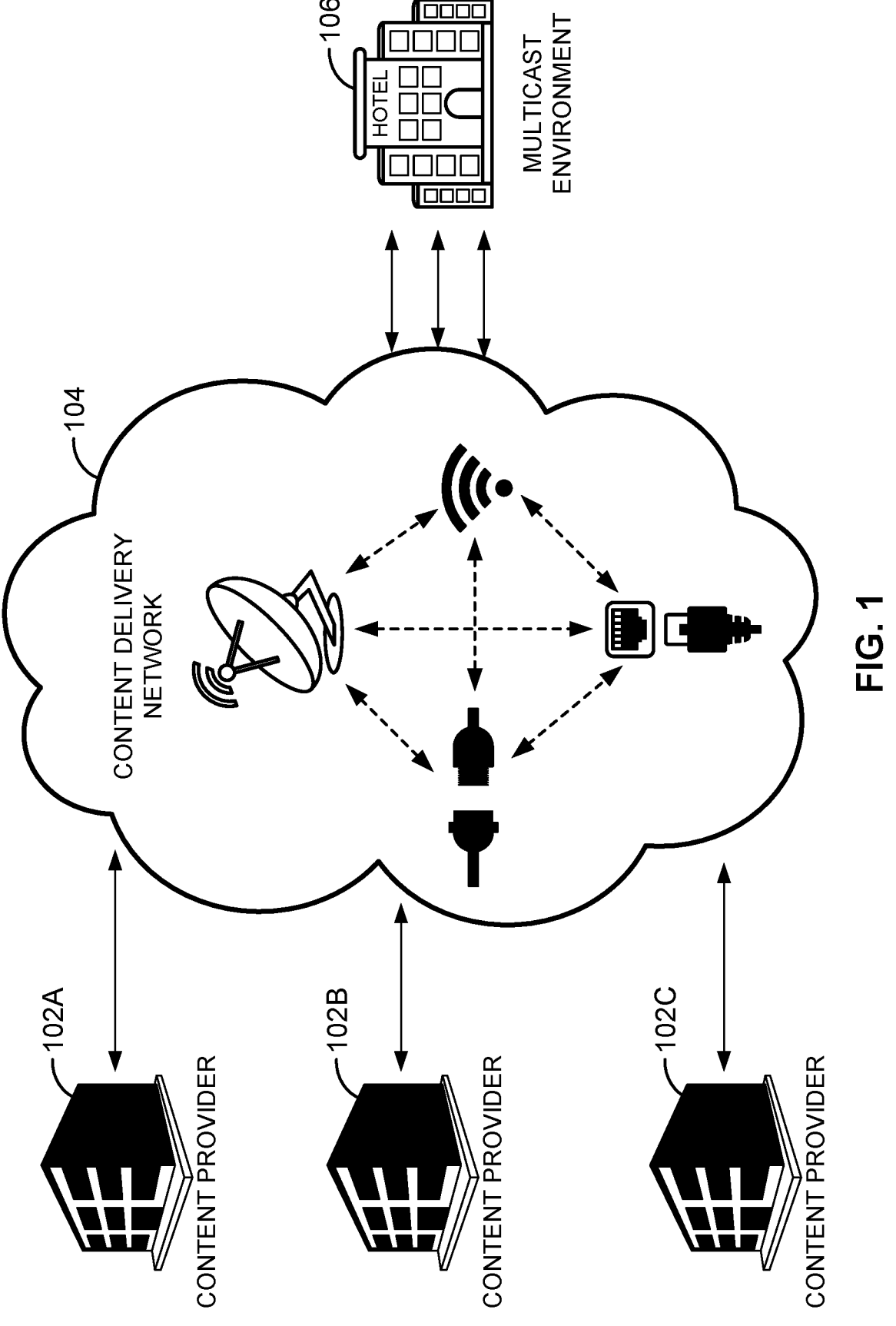
FIG. 1 is an illustrative example of a content delivery network.

Unless specifically stated otherwise, descriptors such as "first," "second," "third," "fourth," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable micropro-cessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, Network Processing Units (NPUs) one or more microcontrollers that may execute first instructions to perform one or more operations and/or func-tions and/or integrated circuits such as Application Specific Integrated Circuits (ASICs). Additionally, the program-mable circuitry may be implemented as an XPU that may be a heterogeneous computing system including multiple types of the above programmable circuitry (e.g., one or more FPGAs, one or more CPUs, one or more GPUs, one or more NPUs, one or more DSPs, etc., and/or any combination(s) thereof). The XPU may include orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, induc-tors, resistors, current paths, diodes, etc. For example, an integrated circuit may be implemented as one or more of an ASIC, an FPGA, a chip, a microchip, programmable cir-cuitry, a semiconductor substrate coupling multiple circuit elements, a system on chip (SoC), etc.

DETAILED DESCRIPTION

In some use cases, unicast systems struggle to support efficient content delivery. For example, consider an envi-ronment that includes both: (1) a large number of devices requesting media, and (2) legacy communications infra-structure having relatively limited total network traffic band-width. Such environments may include, but are not limited to, hotels, malls, restaurants, sports bars, other commercial spaces, multiple dwelling units (MDUs), residential dwell-ings, etc.

If such environments utilize a unicast content delivery network, a sufficiently large number of devices (n) request-ing media at the same time can result in the need to transmit data that exceeds (or constitutes a disproportionate amount of) the total network traffic bandwidth available in the environment. As a result, one or more media playback sessions in the environment may experience a decrease in quality due to buffering, disconnections, etc. Additionally or alternatively, the large request for data from the n devices requesting media may cause other devices (e.g., phones, tablets, laptops) attempting to use the environment's local network to experience disconnections or other latencies. In some examples, a device requesting media is referred to as a client device.

Multicast content delivery systems may be utilized to decrease total network traffic and improve user experiences. In a multicast protocol, a content delivery network enables one transmission of a media stream from a content provider to a primary device (e.g., a server) located within the environment. The primary device then transmits n copies of the media stream to the n devices within the environment requesting the media. Using multicast, the number of trans-missions (e.g., channels of communication dedicated to a particular media stream) between the environment and the content delivery network is reduced from n to 1, thereby decreasing the total network traffic and improving user experiences. As used above and herein, a media stream refers to data used to enable playback of a piece of media (e.g., a movie, a television show, a television channel, a live stream, etc.). Multicast content delivery networks are dis-cussed further in connection with FIGS. 1 and 2.

In some content delivery networks, devices receive over the top (OTT) media as an HTTP stream using the trans-mission control protocol (TCP). As used herein, OTT media refers to media that is transmitted and/or received over the Internet.

To utilize TCP, two devices must engage in a handshake process and an authentication process to identify and verify one another. While the handshake and authentication pro-cesses help ensure accuracy and reliability, these processes also add latency to the data transfer process because each session requires an initial "handshake." As a result, HTTP streams bear an inherent delay in contexts where all devices are trusted.

To remove delay associated with HTTP streaming, some previous approaches to multicast media transmit the media utilizing the User Datagram Protocol (UDP). UDP is a communication protocol that transmits packets of data referred to as datagrams. In some examples, UDP is used for time sensitive communications because it does not include a handshake process. However, multicasting with UDP can lead to inefficient network usage. For example, when a first device and a second device are within a local network and are asynchronously requesting the same media stream. In particular, suppose the first device transmits a first request for a set of frames from corresponding to a linear television channel and, thirty milliseconds (ms) later, the second device transmits the second request for the same set of frames corresponding to the same linear television channel. If each request was handled independently, the set of frames may be multicast to both the first device and the second device twice-once in response to the first request, and a second time in response to the second request. In such an example, the independent processing of the requests results in four transmissions of UDP streams across a local network where only two transmissions were necessary. As a result, the independent processing of media requests increases network traffic and places unneeded computational demands on devices within the network.

Example methods, systems, and apparatus described herein implement a local network that efficiently multicasts UDP streams. A client device and a smart device include a buffer that stores one or more datagrams from previously received UDP stream portions.

The client device and smart device also include request former circuitry that includes a description of the buffer within a header of each new request for media. A local manager includes stream distributor circuitry to receive the request for media and determine the state of the client device buffer by parsing the header. If the stream distributor cir-cuitry determines the datagrams corresponding to the requested media is already in the client device buffer, the local manager transmits only media metadata in response to the request (as opposed to transmitting the media metadata and re-transmitting the datagrams in response to the request). As a result, the client device, smart device, and local manager described consider the asynchronous playback of media and mitigate the unnecessary transmission of extra UDP streams.

FIG. 1 is an illustrative example of a content delivery network. FIG. 1 includes content providers 102A, 102B, 102C, a content delivery network (CDN) 104, and a multicast environment 106.

The content providers 102A, 102B, 102C each correspond to a different media stream. The media stream may be formatted as a linear television channel, video on demand (VOD) or streaming platforms, etc. The media stream may correspond to any type of content, including news, sports, television shows, movies, etc. FIG. 1 illustrates three content providers 102A, 102B, 102C for simplicity. In practice, a given device may request media from any number of content providers.

A given content provider 102A may host one or more compute devices (e.g., servers) that receive requests for content and provide a corresponding media stream via the CDN 104. In some examples, the content provider 102A provides OTT media as HTTP with TCP because the usage of the CDN 104, which includes third party devices not associated with either of the content provider 102A or multicast environment 106, prevents transmission with less secure protocols such as UDP.

In FIG. 1, the CDN 104 enables communication between each of the content providers 102A, 102B, 102C and the multicast environment 106. More generally, the CDN 104 exchanges data between content providers and devices requesting media from the content providers. The data exchange may include HTTP requests and HTTP streams as described above.

The CDN 104 may be implemented by any number of internal nodes using any number of transmission mediums and any number of communication topologies. In the illustrative example of FIG. 1, the CDN 104 is the Internet. However, the CDN 104 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc.

As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The multicast environment 106 refers to any environment with a plurality of devices requesting related media. In examples described herein, the multicast environment 106 is a hotel. In other examples, the multicast environment 106 is a sports bar, a mall, a household with multiple televisions, other commercial or residential dwellings, etc. The multicast environment 106 implements a multicast system in accordance with the teachings of this disclosure.

As part of the multicast system, the multicast environment 106 communicates via the CDN 104 with each of the content providers 102A, 102B, 102C to request content and receive the corresponding media streams. The multicast environment 106 is discussed further in connection with FIG. 2.

Figure 2:
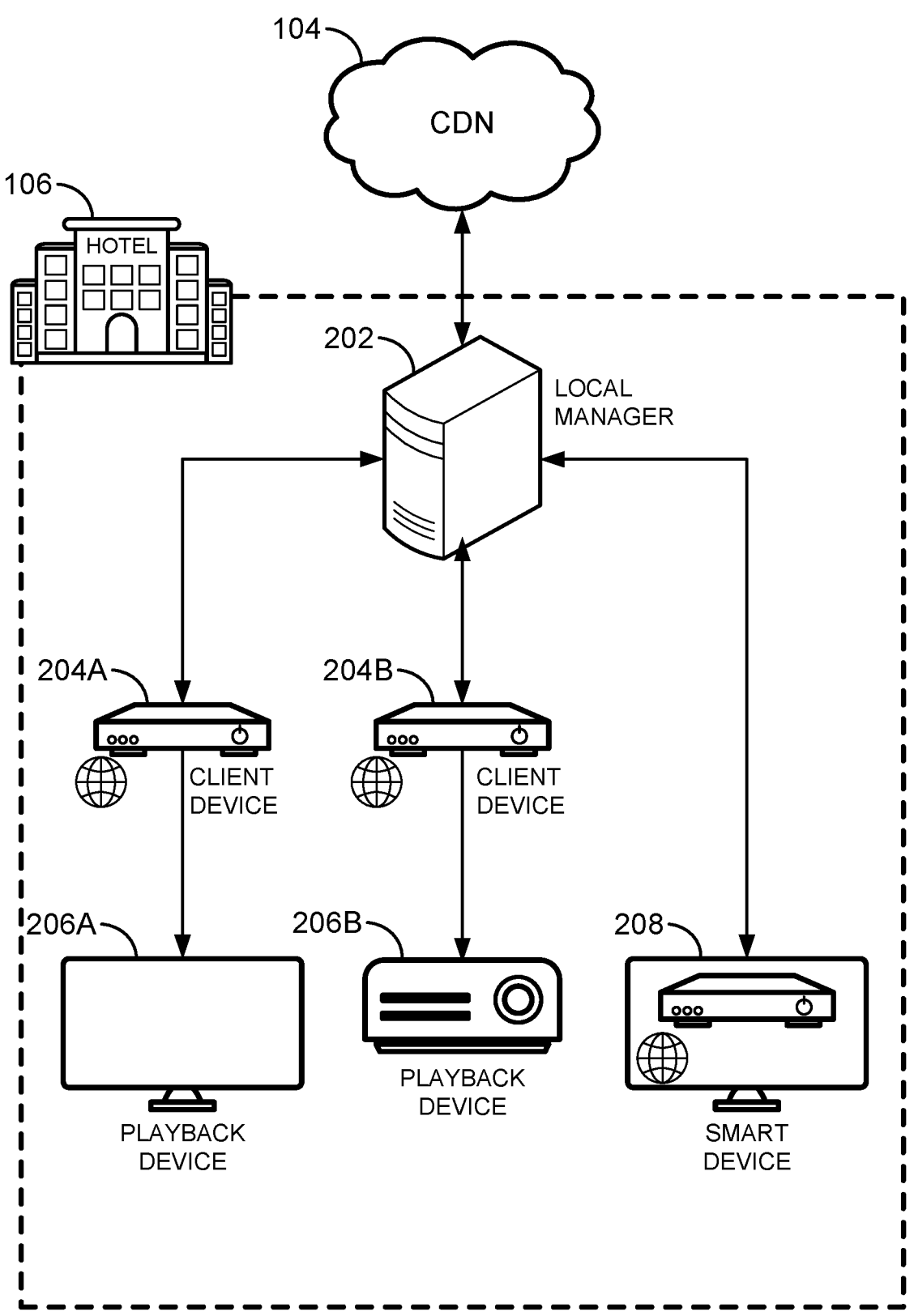
FIG. 2 is a block diagram of an example implementation of the multicast environment of FIG. 1.

FIG. 2 is a block diagram of an example implementation of the multicast environment of FIG. 1. FIG. 2 includes the CDN 104 and the multicast environment 106. The multicast environment 106 includes a local manager 202, client devices 204A and 204B, collectively referred to as client devices 204, playback devices 206A and 206B, collectively referred to as playback devices 206, and a smart device 208.

The local manager 202 is a device that multicasts media streams within the multicast environment 106 in accordance with the teachings of this disclosure. In the illustrative example of FIG. 2, the local manager 202 receives three requests for media streams from the client devices 204. The three requests each correspond to the same media stream (e.g., media from content provider 102A). Upon receiving the requests, the local manager 202 sends a single request for the media stream to the content provider 102A via the CDN 104. Upon receiving the requests, the local manager 202 sends a single request for the media stream to the content provider 102A via the CDN 104 and receives a single HTTP media stream. The local manager 202 then provides a UDP stream to each of the client device 204A, client device 204B, and smart device 208. Advantageously, the local manager 202 avoids duplicated UDP stream transmissions by analyzing the history of previous HTTP requests for media.

In general, the local manager 202 makes one request and receives one media stream over the CDN 104 per unique request generated from the client devices within the multicast environment 106. For example, suppose each of n client devices request media from one of y different media streams (meaning that y≤n, as a client device may only request one media stream for presentation at a time). In such examples, the local manager 202 makes y different transmissions over the CDN 104. The makes y transmissions is more efficient than a unicast protocol (in which each of the client devices communicates separately over the CDN 104, causing n different transmissions). Accordingly, the multicast system for content delivery reduces network traffic when compared to unicast systems. The local manager 202 is discussed further in connection with FIG. 3.

The client devices 204 are devices that request media in accordance with the teachings of this disclosure. The client devices 204 form requests for media based on user input. The client devices 204 may use any suitable form of user input, including but not limited to button presses from a remote or software application, voice commands, etc. In such examples, the client devices 204 include Internet connections to request media streams, receive media metadata, receive user interface data, receive media streams, etc.

In examples described herein, the client devices 204 and the smart device 208 generate requests for media streams that are intended to be presented synchronously across multiple devices. Examples of such synchronous presentation media streams include but are not limited to linear television channels and live streams. In other examples, the client devices 204 and smart device 208 additionally generate requests for media that are intended to be presented asynchronously. Examples of asynchronous media streams include VoD content.

In the illustrative example of FIG. 2, each of the client devices 204 requests the same media stream. The client devices 204 transmit the request to the local manager 202, receive the corresponding media stream, and provide the resulting media data (e.g., synchronized image and audio data) to their respective playback devices 206. The client devices 204 may communicate with the local manager 202 using any suitable LAN topologies that support both HTTP and UDP transmissions. In some examples, a client device is referred to as a set top box (STB), but client devices may take other forms such as software/apps operating on smart televisions, etc. The client devices 204 are discussed further in connection with FIG. 4.

The playback devices 206A, 206B receive the media data from the client devices 204A, 204B respectively. The playback devices 206 present the video data so it is viewable by a user. The playback devices 206 may be implemented by any device that can present media and communicate with the client devices 204. For example, in FIG. 2, the playback device 206A is a television and the playback device 206B is a projector. The playback devices 206 receive media data from the client devices 204 using any suitable communication interface. Example communication interfaces for video transmission include but are not limited to Universal Serial Bus-C (USB-C), High Definition Multimedia Interface (HDMI), Digital Visual Interface (DVI), DisplayPort, Video Graphics Array (VGA), Radio Corporation of America (RCA) cables, etc. In some examples, the playback devices 206 have internal speaker components to present the audio portion of the media. In other examples, the playback devices 206 connect to external speakers to present the audio.

The smart device 208 is a device that includes the functionality of both the client devices 204 and playback devices 206. That is, the smart device 208 forms requests for media based on user input, transmits requests for media to the local manager 202, receives a multicast media stream from the local manager 202, and presents the media on a display. In some examples, the smart device 208 includes an Internet connection to implement a web application. The smart device 208 is discussed further in connection with FIG. 4.

While FIG. 2 shows two client devices 204A, 204B and one smart device 208 for simplicity, any number of client devices 204 or smart devices 208 may be implemented within the multicast environment 106. For example, a hotel may include either a client device 204A or a smart device 208 in each hotel room so that the device used by guests to view media (e.g., either a playback device 206 or a smart device 208) receives said media as part of the multicast system. Generally, the multicast environment 106 implements one client device (e.g., client device 204A) for each playback device (e.g., playback device 206A).

FIG. 2 describes two client devices 204 and a smart device 208 that are each requesting the same media stream. The local manager 202 receives the three requests, determines if each request identifies the same media stream, and transmits only requests that reaches the CDN 104. In doing so, the local manager 202 implements media multicasting and reduces the network traffic between the hotel and the CDN 104.

While multicasting techniques generally decrease network traffic between a local network (e.g., the multicast environment 106) and an external network (e.g., the CDN 104), other media multicast environments that process requests independently exhibit a large volume of traffic within the local network due to the unnecessary transmission of the same datagram(s) more than once within a short period. Such other environments include local managers configured to respond to requests for media independently, which results in the unnecessary transmission of UDP streams when two devices are requesting the same media stream asynchronously.

Advantageously, the client devices 204 and smart device transmits requests for media in accordance with the teachings of this disclosure. Additionally, the local manager 202 transmits UDP streams in accordance with the teachings of this disclosure. As a result, the multicast environment 106 exhibits fewer communications between devices within the local network than local managers that process requests for media independently. By avoiding extra media stream transmissions, the local manager 202 decreases internal network traffic compared to other systems. The decrease in the amount of internal network traffic dedicated to media transfer also means the local network has more available bandwidth for internal communications. The extra bandwidth may be used to improve the performance of other functions not related to media transfer.

Figure 3:
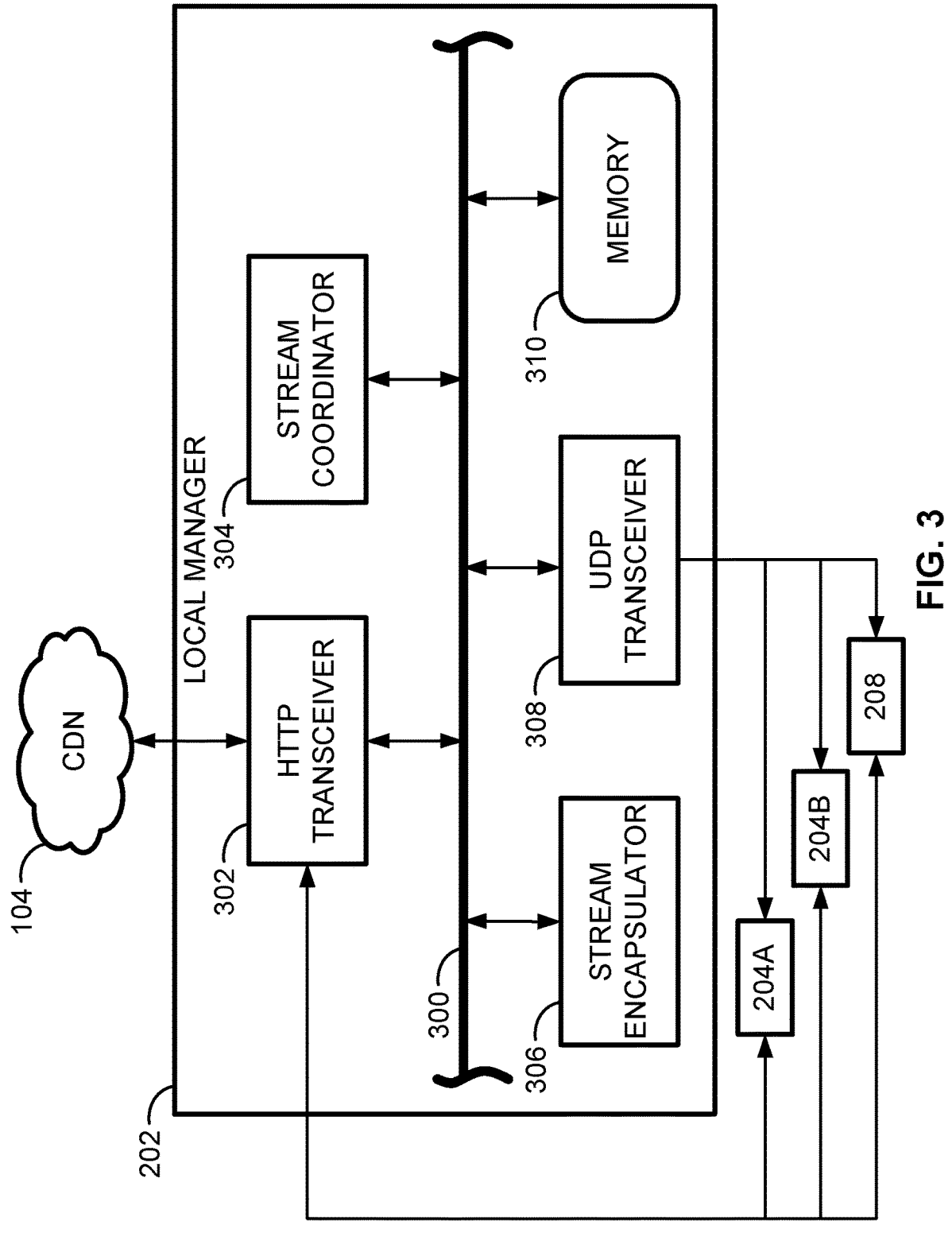
FIG. 3 is a block diagram of an example implementation of the local manager of FIG. 2.

FIG. 3 is a block diagram of an example implementation of the local manager 202 of FIG. 2 to multicast media. The local manager 202 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the local manager 202 of FIG. 2 may be instantiated by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

FIG. 3 includes the CDN 104, local manager 202, and a client device 204A. The local manager 202 includes a bus 300, HTTP transceiver circuitry 302, stream coordinator circuitry 304, stream encapsulator circuitry 306, UDP transceiver circuitry 308, and memory 310.

The bus 300 refers to one or more physical connection (e.g., an interconnect, copper trace, etc.) that enables communication between the UDP transceiver circuitry 308, HTTP transceiver circuitry 302, stream encapsulator circuitry 306, stream coordinator circuitry 304, and memory 310. The bus 300 may be implemented using one or more communication systems that meet pre-determined threshold power and latency requirements.

The HTTP transceiver circuitry 302 transmits and receives data with HTTP. For example, the HTTP transceiver circuitry 302 receives HTTP requests from the client devices 204 and smart device 208. The HTTP transceiver circuitry 302 also transmits HTTP requests to the CDN 104, receives HTTP streams from the CDN 104, and transits metadata to the client devices 204 and smart device 208. The HTTP transceiver circuitry 302 receives an instruction to transmit data from another internal component of the local manager 202 via the bus 300. Similarly, after receiving data from an external device, the HTTP transceiver circuitry 302 provides the data to another internal component of the local manager 202 via the bus 300. In some examples, the HTTP transceiver circuitry 302 is instantiated by programmable circuitry executing HTTP transceiver instructions and/or configured to perform operations such as those discussed in connection with FIG. 5.

The stream coordinator circuitry 304 causes transmission of UDP streams in accordance with the teachings of this disclosure. When the HTTP transceiver circuitry 302 first receives an HTTP request for a media stream, the stream coordinator circuitry 304 parses a header from the request to determine if the sender of the request (e.g., one of the client devices 204 or the smart device 208) is already storing datagrams corresponding to the request. If the sender is not already storing datagrams, the stream coordinator circuitry 304 causes the HTTP transceiver circuitry 302 to transmit a request via the CDN 104 for the media stream indicated by the request. In such examples, the stream coordinator circuitry 304 also causes the UDP transceiver circuitry 308 to multicast a copy of the response from the CDN 104 to each client device and smart device that is actively transmitting requests for the same media stream.

In some examples, the stream coordinator circuitry 304 causes transmission of both a UDP stream and media metadata in response to determinations that the sender of a request for media is not storing the corresponding datagrams. As used above and herein, media metadata refers to information that may be used to cause presentation of video data. Media metadata may include, for example, the index of a buffer corresponding to a particular datagram. In some examples, media metadata includes additional information including but not limited describing the genre, runtime, ratings, cast information, etc. Media metadata, transmitted via the HTTP transceiver circuitry 302, and datagrams, transmitted via the UDP transceiver circuitry 308, may be used together by the client devices 204 or smart device 208 to cause playback of the requested media.

If the sender of the request is already storing datagrams that correspond to the request, the stream coordinator circuitry 304 causes the HTTP transceiver circuitry 302 to transmit only media metadata. That is, the stream coordinator circuitry 304 does not cause transmission of a UDP stream when the sender of a request for media is already storing datagrams corresponding to the request.

In some examples, the local manager 202 receives multiple requests for media from the client devices 204 and smart device 208 that have different bit rates. Further, the HTTP transceiver circuitry 302 may receive and request media stream segments using the bit rate information based in the requests. In such examples, the stream coordinator circuitry 304 removes or edits parts of the received media streams such that each of the media segments transmitted to the client devices 204 and smart device 208 correspond to the same bit rate. In doing so, the local manager 202 prevents the client devices 204 or smart device 208 from engaging in adaptive bit rate streaming, thereby ensuring a uniform presentation of media throughout the multicast environment 106.

In some examples, the stream coordinator circuitry 304 is instantiated by programmable circuitry executing stream coordinator instructions and/or configured to perform operations such as those discussed in connection with FIGS. 6 and 9.

In examples where the stream coordinator circuitry 304 causes the HTTP transceiver circuitry to transmit a request for media via the CDN 104, the HTTP transceiver circuitry 302 also receives an HTTP stream from a corresponding content provider (e.g., content provider 102A). As used above and herein, a HTTP stream refers to data that enables playback of media using HTTP. Example HTTP streams include but are not limited to HTTP Live Streaming (HLS), Dynamic Adaptive Streaming over HTTP (DASH), and Common Media Application Format (CMAF). In some examples, a HTTP stream enables the playback of live content.

The stream encapsulator circuitry 306 receives the HTTP stream from the content provider 102A via the HTTP transceiver circuitry 302 and the bus 300. The stream encapsulator circuitry 306 segments the HTTP stream into one or more packets of data and encapsulates each HTTP packet with a UDP header. Each encapsulated packet may be referred to as a datagram. As used herein, a UDP stream refers to data that enables the communication of media utilizing UDP. A UDP stream includes one or more datagrams and metadata that describes the order of the datagrams. In some examples, the stream encapsulator circuitry 306 is instantiated by programmable circuitry executing stream encapsulator instructions and/or configured to perform operations such as those discussed in connection with FIG. 5.

The UDP transceiver circuitry 308 transmits data with the UDP. For example, the UDP transceiver circuitry 308 receives a UDP stream from the stream encapsulator circuitry 306 via the bus 300. The UDP transceiver transmits a copy of the UDP stream to one or more client devices 204 as instructed by the stream coordinator circuitry 304. In some examples, the UDP transceiver circuitry 308 is instantiated by programmable circuitry executing UDP transceiver instructions and/or configured to perform operations such as those discussed in connection with FIG. 5.

One or both of the HTTP transceiver circuitry 302 and the UDP transceiver circuitry 308 may include any number of hardware components to support communication with external devices. The hardware components may include but are not limited to one or more cable ports for wired communications, one or more antennas for wireless communication, etc.

The memory 310 stores data used by the other internal components of the local manager 202 to multicasting. For example, the memory 310 may include one or more caches used by the stream encapsulator circuitry 306 to receive a HTTP stream and produce a UDP stream. The memory 310 may additionally store data including but not limited to a list of content providers 102, a list of media streams, a list of client devices 204, a list of smart devices, etc.

The memory 310 may be implemented as any type of memory. For example, the memory 310 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

As described above, the HTTP streams received by the CDN can cause delays in transmission due to the handshake and verification procedures of TCP. The delays may cause buffers or disconnections in the presentation of the media and decrease the quality of the user experience. Accordingly, the local manager 202 includes the stream encapsulator circuitry 306 so a media stream can be quickly transmitted to multiple client devices 204 as a UDP stream. However, multicasting media environments can cause inefficient network transmissions if each request for media is processed independently.

Advantageously, if the sender of a request for media is already storing datagrams corresponding to the request, the stream coordinator circuitry 304 does not trigger a transmission of a HTTP request to the CDN 104 or an additional transmission of a UDP stream to the sender. Rather, the stream coordinator circuitry 304 only causes the HTTP transceiver circuitry 302 to transmit media metadata corresponding to the media stream. Accordingly, the stream coordinator circuitry 304 enables the client device or smart device to use an earlier transmission of a UDP stream for media playback and avoids an unneeded second transmission of said UDP stream.

In examples described above and herein, the client devices 204 and the smart device 208 receive media metadata from the HTTP transceiver circuitry 302 using HTTP and receive media streams via the UDP transceiver circuitry 308. This manner provides a balance between the probability of packet loss, which is higher with UDP than with HTTP using TCP, and network bandwidth, which UDP streams consumes less of than HTTP streams using TCP.

Advantageously, the local manager 202 can use either HTTP or UDP to transmit either of the media streams or the media metadata. The local manager 202 may determine which protocol to use based on the strength or integrity of the local network (e.g., based on the probability of packet loss and an amount of available bandwidth in the local network). In some examples, the local manager 202 transmits both media metadata and media streams using HTTP. In other examples, the local manager 202 transmits the media metadata using HTTP and the media streams using UDP as described above and throughout. In still other examples, the local manager 202 transmits both media metadata and media streams using UDP.

Figure 4:
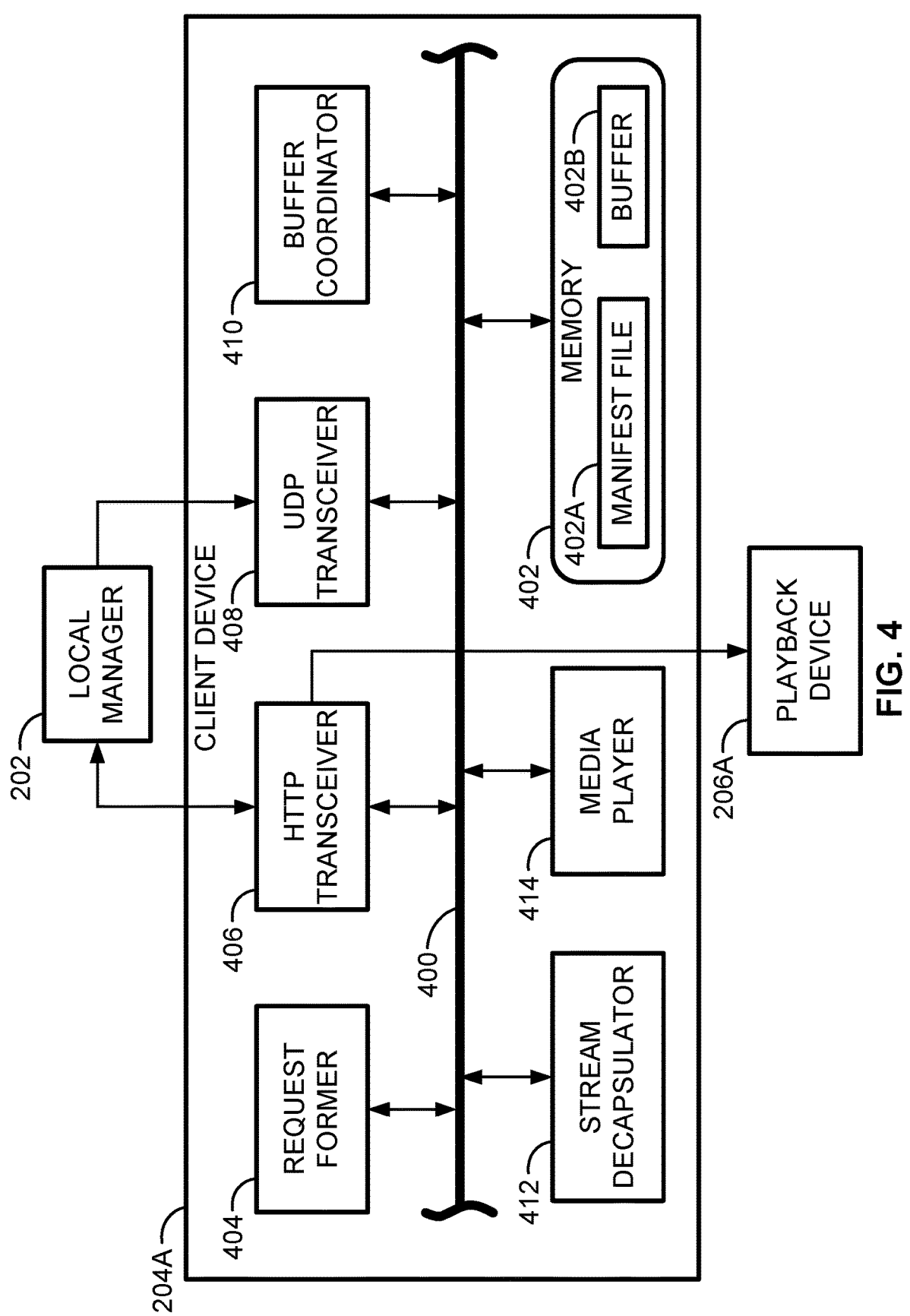
FIG. 4 is a block diagram of an example implementation of the client device of FIG. 2.

FIG. 4 is a block diagram of an example implementation of the client device 204A of FIG. 1 to request media. The client device 204A of FIG. 2 may be instantiated (e.g., creating an instance of, bring into being for any length of time, materialize, implement, etc.) by programmable circuitry such as a Central Processor Unit (CPU) executing first instructions. Additionally or alternatively, the client device 204A of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

FIG. 4 includes the local manager 202, the client device 204A, and the playback device 206. The client device 204A includes a bus 400, memory 402, request former circuitry 404, HTTP transceiver circuitry 406, UDP transceiver circuitry 408, buffer coordinator circuitry 410, stream decapsulator circuitry 412, and media player circuitry 414. The memory 402 includes a manifest file 402A and a buffer 402B.

In the example of FIG. 4, the bus 400, request former circuitry 404, HTTP transceiver circuitry 406, UDP transceiver circuitry 408, media player circuitry 414, and memory 402 implement the client device 204A. In some examples, the bus 400, request former circuitry 404, HTTP transceiver circuitry 406, UDP transceiver circuitry 408, media player circuitry 414, and memory 402 may additionally or alternatively implement the client device 204B and/or the smart device 208.

The bus 400 refers to one or more physical connections (e.g., an interconnect, copper trace, etc.) that enables communication between the internal components of the client device 204A. The bus 400 may be implemented using one or more communication systems that meet pre-determined threshold power and latency requirements.

The memory 402 stores data to facilitate the operations of the internal components of client device 204. For example, the memory 402 may store media metadata, a look up table used by the media player to map wireless signals to button presses, an address of the local manager 202, a port number of the playback device 206A, etc.

The memory 402 includes a manifest file 402A. The manifest file 402A refers to data that may be used the client device 204A to request, from the local manager 202, a particular portion of a particular media stream. In some examples, the manifest file 402A is generated by local manager 202 and/or describes which content providers 102 are accessible to the local manager 202. The manifest file 402A is discussed further in connection with FIG. 5.

The memory includes a buffer 402B. The buffer 402B is a first in first out (FIFO) buffer that temporarily stores datagrams (i.e., portions of a UDP media stream) before the datagrams are presented on the playback device 206A. Datagrams are stored in and removed from the buffer 402B by the buffer coordinator circuitry 410. In some examples, the buffer 402B includes both datagrams and non-UDP data (e.g., media metadata) in the buffer 402B.

The memory 402 may be implemented as any type of memory. For example, the memory 402 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

The request former circuitry 404 forms requests for media. To do so, the request former circuitry may include any number of hardware components to receive inputs from a user. For example, the request former circuitry 404 may include infrared and/or Bluetooth antennas to detect keypresses from a remote control. In some examples, the request former circuitry 404 includes a microphone and a natural language processing module to receive a voice command from a user.

The request former circuitry 404 may interpret the control signal from the user (button presses, text corresponding to a voice command, etc.) to determine a particular media stream should be presented on the playback device 206A. In some examples, the request former circuitry 404 communicates with the media player circuitry 414 via the bus 400 to interpret the signal based on a user interface (UI) presented on the playback device 206A.

After determining a media stream should be presented on the playback device 206A, the request former circuitry 404 produces a request data structure in accordance with the teachings of this disclosure. A request data structure refers to an amount of data that may be transmitted to request a media stream. The request data structure includes a header portion that describes a current state of the buffer 402B. The current state of the buffer may describe information including but not limited to the length of the buffer, the number of datagrams stored in the buffer, an identification of the media stream(s) corresponding to the stored datagrams, media segment length information (e.g., a range of time stamps or a number of video frames) corresponding to the stored datagrams, etc. In some examples, the request former circuitry 404 is instantiated by programmable circuitry executing request former instructions and/or configured to perform operations such as those represented by the flowchart(s) of FIG. 6.

The HTTP transceiver circuitry 406 transmits and receives data with HTTP. For example, the HTTP transceiver circuitry 302 transmits a HTTP request for a media stream to the local manager 202. The HTTP transceiver circuitry 302 also transmits a HTTP stream to the playback device 206A to enable presentation of the media stream. In some examples, the HTTP transceiver circuitry 406 is instantiated by programmable circuitry executing HTTP transceiver instructions and/or configured to perform operations such as those represented by the flowchart(s) of FIG. 6.

The UDP transceiver circuitry 408 transmits and receives data with UDP. For example, the UDP transceiver circuitry 408 receives a copy of a UDP stream that has been multicast from the local manager 202. In some examples, the UDP transceiver circuitry 408 is instantiated by programmable circuitry executing UDP transceiver instructions and/or configured to perform operations such as those represented by the flowchart(s) of FIG. 6.

The buffer coordinator circuitry 410 stores data in and removes data from the buffer 402B in accordance with the teachings of this disclosure. For example, the buffer coordinator circuitry 410 may receive one or more datagrams via the UDP transceiver circuitry 408 before a request for said datagrams has been transmitted to the local manager 202. In such examples, the buffer coordinator circuitry 410 stores the datagrams in the buffer 402B. Later, when the request for media is transmitted and the corresponding media metadata is received, the buffer coordinator circuitry 410 removes one or more datagrams from the buffer 402B and provides the datagrams to the stream decapsulator circuitry 412 via the bus 400. In other examples, the client device 204A does not receive the corresponding media metadata in a threshold amount of time. In such examples, the buffer coordinator circuitry 410 removes the datagrams from the buffer 402B without providing the information to other internal components of the client device 204A.

The stream decapsulator circuitry 412 receives datagrams from a UDP stream and produces a corresponding HTTP stream. In some examples, the stream decapsulator circuitry 412 receives the datagrams from the buffer coordinator circuitry 410 via the buffer. In other examples, stream decapsulator circuitry 412 receives the datagrams directly from the local manager 202 via the UDP transceiver circuitry 408. To produce the HTTP stream, the stream decapsulator circuitry 412 removes the UDP headers from the datagrams and combines the underlying HTTP packets in a specific order provided by the UDP stream metadata. By reverting the multicast UDP stream (i.e., the datagrams) back to an HTTP stream, the media player circuitry 414 can present multiple types of media streams, regardless of what digital rights management (DRM) support the playback device 206A has. The stream decapsulator circuitry 412 provides the HTTP stream to the media player circuitry 414 via the bus 400.

The media player circuitry 414 manages the image and audio data transmitted to the screen. For example, the media player circuitry 414 may implement one or more user interfaces used to present a channel guide, content search results, media controls (play, pause, forward, rewind, fast forward), etc., on the playback device 206A. The media player circuitry 414 also receives an HTTP stream and determines when to provide various portions of video data to the playback device 206A for presentation. To determine what image and video data should be presented on the playback device 206A, the media player may also interpret control signals (button presses, voice commands, etc.) generated by a user and received with corresponding hardware. In some examples, the media player circuitry 414 is instantiated by programmable circuitry executing media player instructions and/or configured to perform operations such as those represented by the flowchart(s) of FIG. 6.

Advantageously, the client devices 204 and smart device 208 are implemented with the request former circuitry 404 and the buffer coordinator circuitry 410 in accordance with the teachings of this disclosure. The request former circuitry 404 and buffer coordinator circuitry 410 enable the client device 204A to both maintain a buffer of temporary datagrams and report the status of the buffer to the local manager 202. By doing so, the local manager 202 can receive a response data structure with information that enables the local manager 202 to determine whether another transmission of a UDP stream is needed. As a result, the client device 204A helps to reduce network traffic and improve efficiency within the multicast environment 106.

Figure 5:
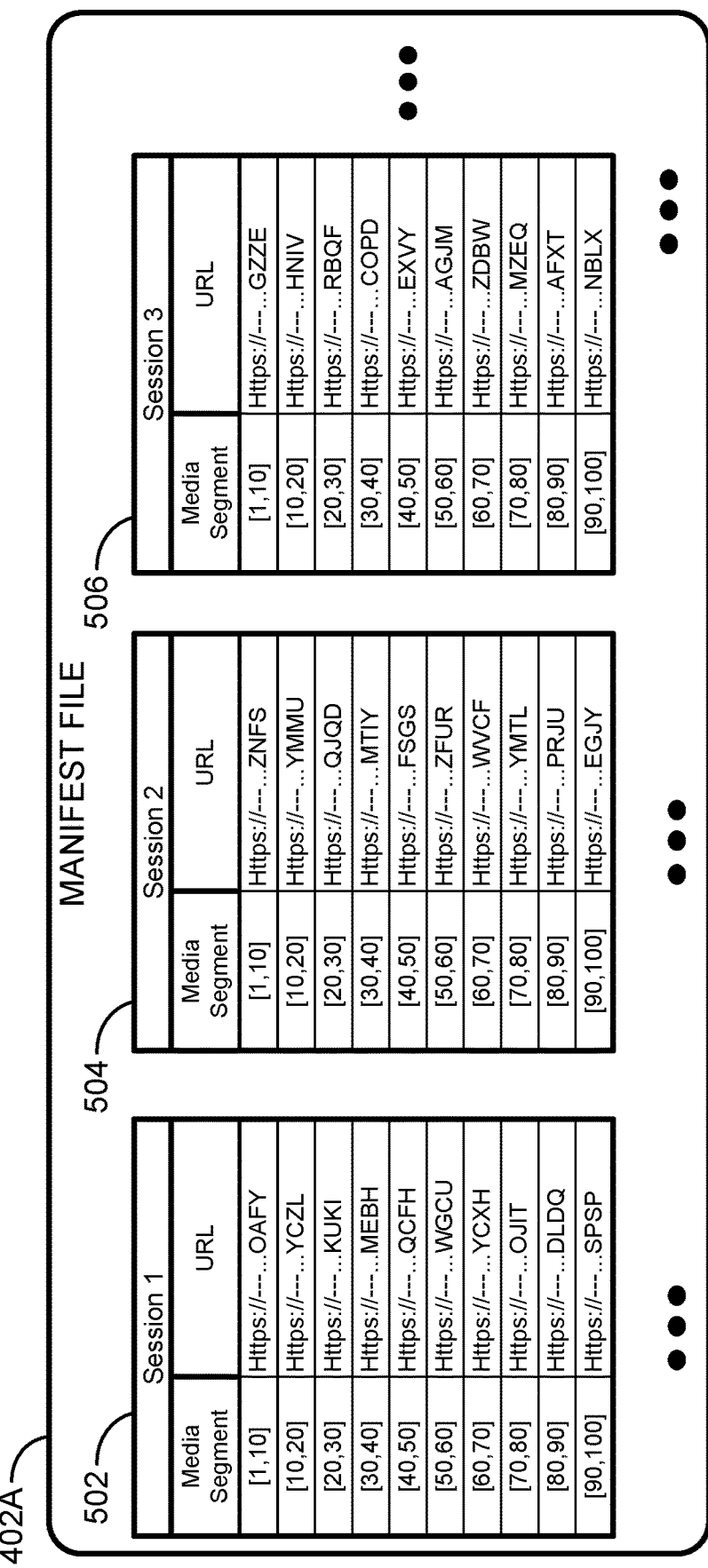
FIG. 5 is an example implementation of the manifest file of FIG. 4.

FIG. 5 is an example implementation of the manifest file 402A of FIG. 4. The manifest file 402A includes session lists 502, 504, 506.

The session lists 502, 504, 506 each correspond to a different media stream accessible by the local manager 202. While three session lists are shown in the example of FIG. 5, the manifest file 402A may contain any number of session lists in practice. While each session list 502, 504, 506, includes a media segment field and a URL field, in practice, the session lists 502, 504, 506, may have any number of additional fields. The session lists 502, 504, 506 may correspond to both linear television channels and VOD titles.

Each of the session lists 502, 504, 506 include a list of media segments and a corresponding list of uniform resource links (URLs). A media segment refers to one portion of a media stream. In FIG. 5, the media segments are defined by time stamps, listed in seconds. For example, a media segment of [0, 10) refers to a portion of a media stream that begins at a timestamp of 0 seconds, inclusive, and ends at a timestamp of 10 seconds, exclusive. In other examples, the media segments may be defined through another mechanism (e.g., indices of video frames) or refer to other lengths of time.

The session lists 502, 504, 506 store URLs that identify a particular media segment. When the request former circuitry 404 forms a request for media, it transmits a HTTP request using the URL. If the local manager 202 determines that stream portions (e.g., UDP datagrams) should be provided to the client devices 204 or smart device 208 in response to the request, the local manager 202 uses the URL to determine which content provider 102 to contact and which media segment to request datagrams for. In the example of FIG. 5, each of the URLs end with a different sequence of letters to show that they are unique. In other examples, the URLs may include a different combination of characters in a different order.

A session list 502 may include any number of media segments and corresponding URLs. If a session list corresponds to a linear television channel, the session list could be hypothetically represented as having infinite length because the linear television channel is a continuous media stream. In contrast, a session list corresponding to a VOD title would have a finite length given by the runtime of the VOD title (e.g., a television show, comedy special, movie, etc.). In some examples, the local manager 202 may provide updates to the client devices 204 and smart device 208 to add, remove, or edit one or more session lists 502, 504, 506 within the manifest file 402A.

In some examples, the stream coordinator circuitry 304 of the local manager 202 identifies that two devices within the multicast environment 106 (e.g., the client device 204A and client device 204B) are transmitting requests from the same session list 502, which corresponds to a live stream or a linear television channel, asynchronously. For example, the client device 204A may transmit a HTTP request with Https://---...KUKI to obtain datagrams corresponding to [20,30) of session 1 in a first instance. In such examples, the second client device 204B transmits the same HTTP request with Https://---...KUKI within a threshold time amount of time from the first instance. In the foregoing example, systems that process requests for media independently would transmit a copy of the datagrams corresponding to [20,30) to both client devices 204A, 204B at both the first instance and the second instance, for a total of four transmissions. Such a previous system increases network traffic and computational resource usage because of the extra transmission of datagrams in response to the second request.

Advantageously, the client devices 204 and smart device 208 include request former circuitry 404 that includes a description of the buffer 402B contents. Accordingly, in the foregoing example, the second HTTP request transmitted by the client device 204B includes header data that indicates the buffer 402B currently stores datagrams corresponding to [20, 30) of Stream 1. The datagrams in the buffer 402B of the client device 204B were received when the local manager 202 multicast the datagrams in response to the first request sent by the client device 204A. As a result, when the stream coordinator circuitry 304 of the local manager 202 parses the header of the second request, the stream coordinator circuitry 304 determines that the client device 204B already has the necessary datagrams and responds by only transmitting media metadata. Through this manner, the local manager 202, client devices 204, and smart device 208 avoid unneeded datagram transmissions and improve the efficiency of network traffic within the multicast environment 106.

While an example manner of implementing the local manager 202, the client devices 204, and the smart device 208 of FIG. 2 is illustrated in FIGS. 3 and 4, one or more of the elements, processes, and/or devices illustrated in FIGS. 3 and 4 may be combined, divided, re-arranged, omitted, eliminated, and/or implemented in any other way. Further, the HTTP transceiver circuitry 302, the stream coordinator circuitry 304, the stream encapsulator circuitry 306, the UDP transceiver circuitry 308 and/or, more generally, the local manager 202 of FIG. 2, may be implemented by hardware alone or by hardware in combination with software and/or firmware. Similarly, the request former circuitry 404, the HTTP transceiver circuitry 406, the UDP transceiver circuitry 408, the buffer coordinator circuitry 410, the stream decapsulator circuitry 412, the media player circuitry 414, and/or, more generally, the client devices 204 and the smart device 208 may be implemented by hardware alone or by hardware in combination with software and/or firmware Thus, for example, any of the HTTP transceiver circuitry 302, the stream coordinator circuitry 304, the stream encapsulator circuitry 306, the UDP transceiver circuitry 308, the request former circuitry 404, the HTTP transceiver circuitry 406, the UDP transceiver circuitry 408, the buffer coordinator circuitry 410, the stream decapsulator circuitry 412, the media player circuitry 414, and/or, more generally, the local manager 202, the client devices 204, and the smart device 208, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the local manager 202, the client devices 204, and the smart device 208 of FIG. 2 may include one or more elements, processes, and/or devices in addition to, or instead of, those illustrated in FIGS. 3 and 4, and/or may include more than one of any or all of the illustrated elements, processes and devices.

Figure 6:
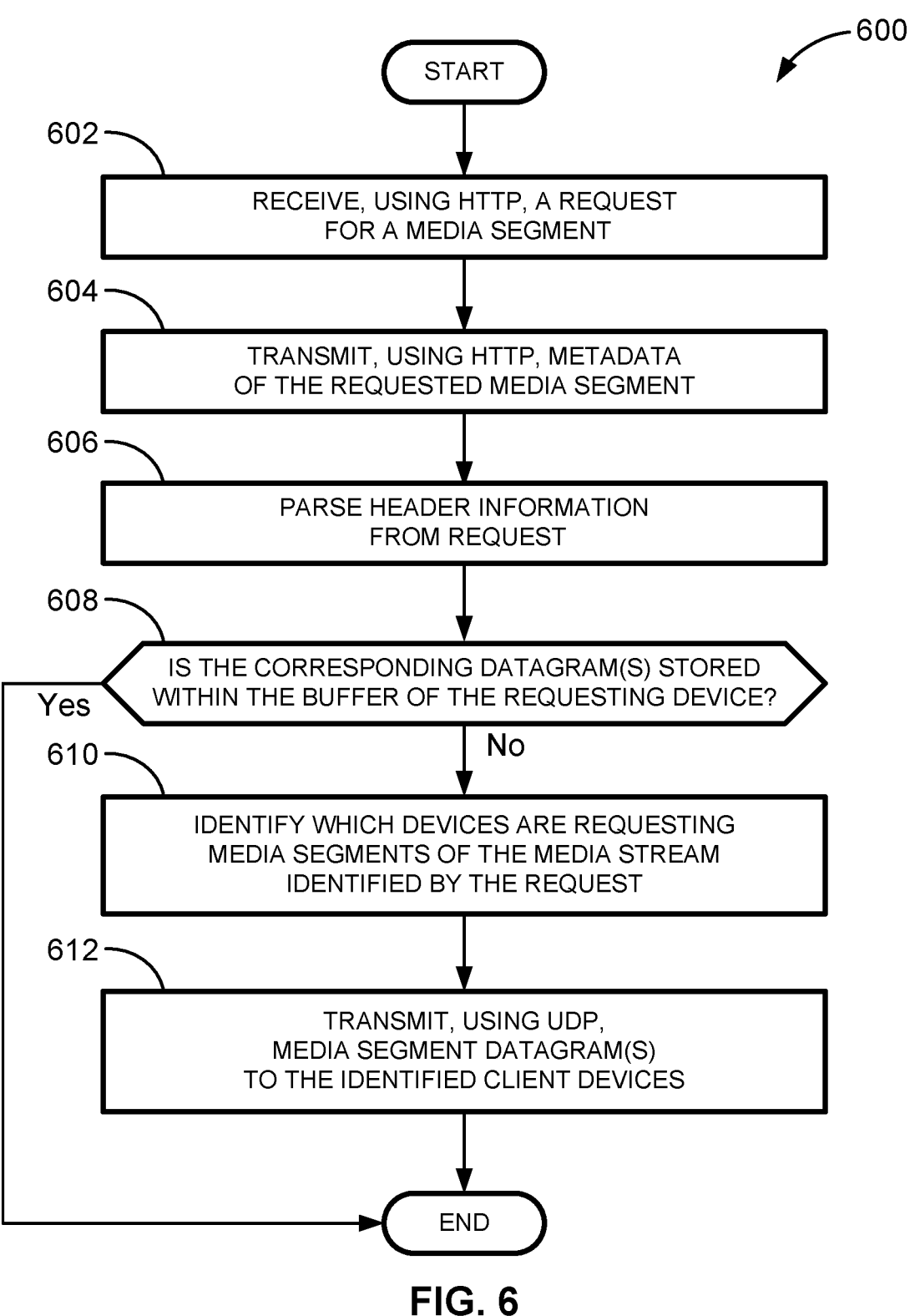
FIG. 6 is a flowchart representative of example machine readable instructions and/or example operations that may be executed, instantiated, and/or performed by example programmable circuitry to implement the local manager of FIG. 2.
Figure 7:
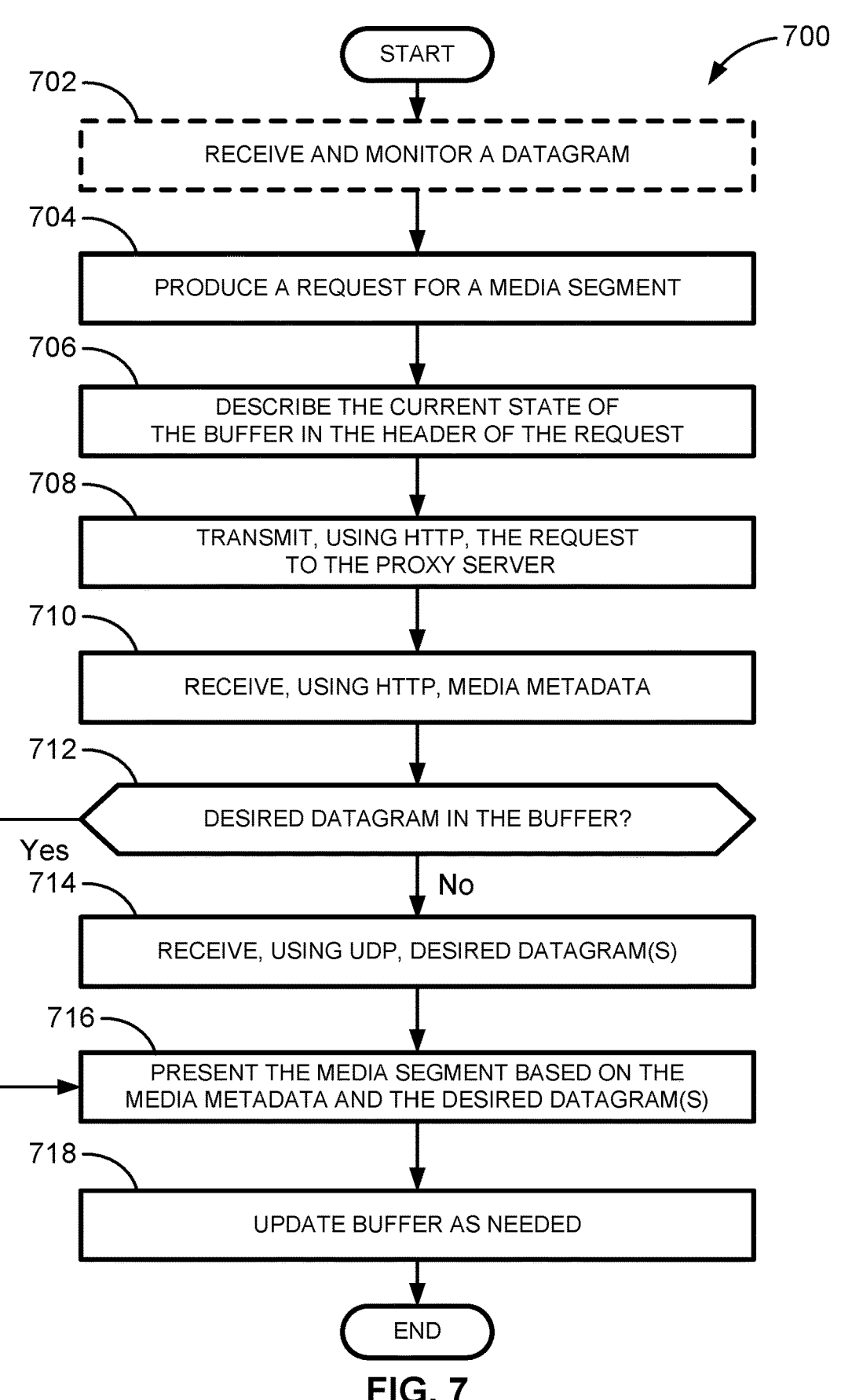
FIG. 7 is a flowchart representative of example machine readable instructions and/or example operations that may be executed, instantiated, and/or performed by example programmable circuitry to implement the client device or smart device of FIG. 2.
Figure 8:
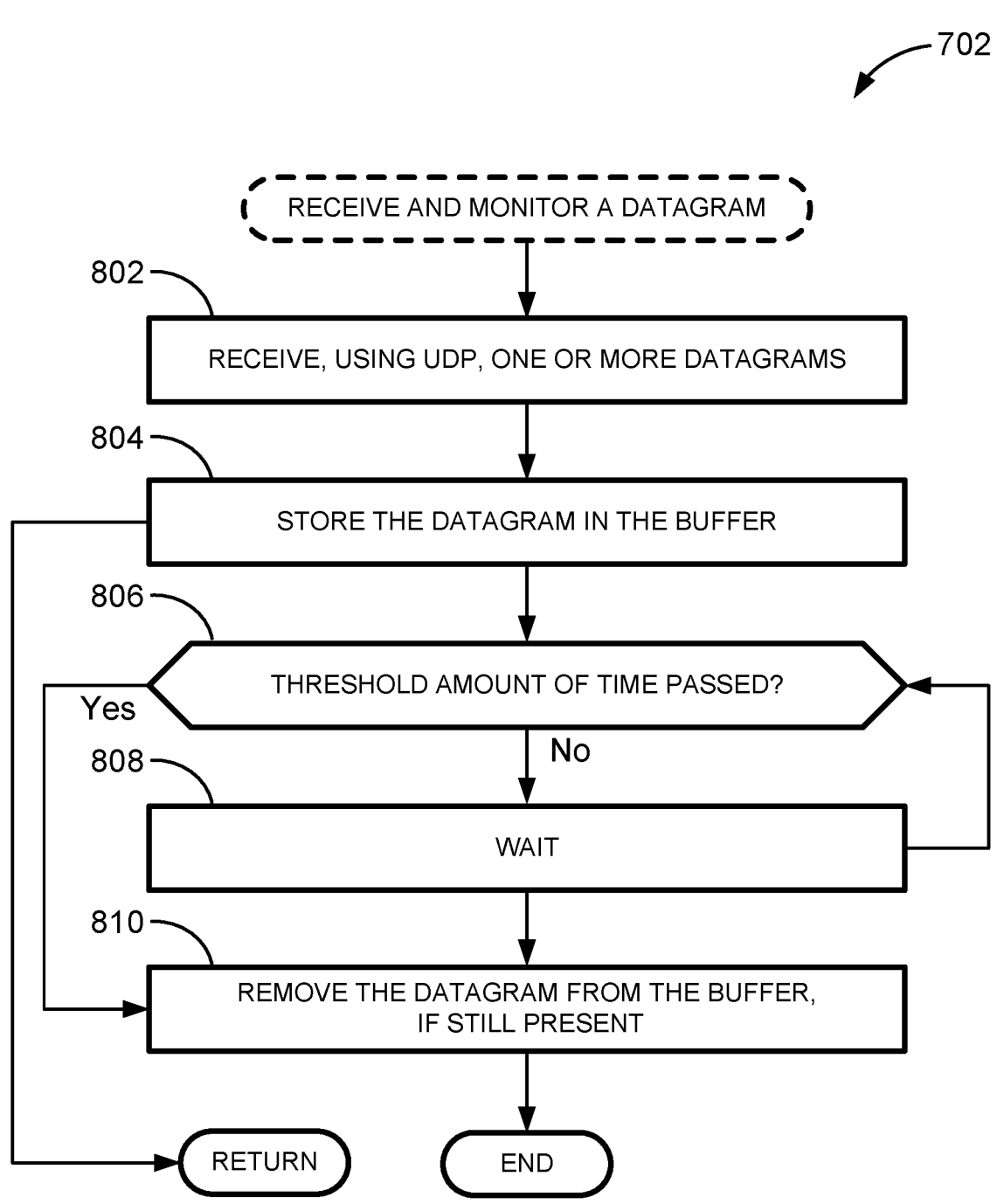
FIG. 8 is a flowchart representative of example machine readable instructions and/or example operations that may be executed, instantiated, and/or performed by example programmable circuitry to receive a datagram as described in connection with FIG. 7.

Flowchart(s) representative of example machine readable instructions, which may be executed by programmable circuitry to implement and/or instantiate the local manager 202, the client devices 204, and the smart device 208 of FIG. 2 and/or representative of example operations which may be performed by programmable circuitry to implement and/or instantiate the local manager 202, the client devices 204, and the smart device 208 of FIG. 2, are shown in FIGS. 6, 7, 8. The machine readable instructions may be one or more executable programs or portion(s) of one or more executable programs for execution by programmable circuitry such as the programmable circuitry 1012 shown in the example programmable circuitry platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6, 7, 8, many other methods of implementing the example [ER-Apparatus] may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6, 7, 8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed, instantiated, and/or performed by programmable circuitry to implement the local manager 202 and multicast media streams. The flowchart of FIG. 6 describes operations that may be performed to enable presentation of one media segment on one of the playback devices 206 or the smart device 208. In practice, the local manager 202 may repeatedly execute the operations of FIG. 6 any number of times to enable the presentation of multiple media segments on multiple devices.

The machine-readable instructions and/or the operations 600 of FIG. 6 begin when the HTTP transceiver circuitry 302 receives a request for a media segment. (Block 602). The HTTP transceiver circuitry 302 receives the request from one of the client devices 204 or the smart device 208. The request is an HTTP request that identifies a particular portion of a media stream accessible by the local manager 202. In some examples, the request identifies the portion using a URL as described above. The portion of the media stream may correspond to any number of datagrams.

The stream coordinator circuitry 304 causes the HTTP transceiver circuitry 302 to transmit media metadata corresponding to the requested media segment. (Block 604). The HTTP transceiver circuitry 302 transmits the media metadata to one of the client devices 204 or smart device 208. When combined with datagrams, the media metadata enables playback of the portion of the media stream on the playback devices 206 or smart device 208.

The stream coordinator circuitry 304 parses header information from the request of block 602. (Block 606). The header information contains a description of the contents of the buffer 402B within the device that sent the request.

The stream coordinator circuitry 304 uses the header information to determine whether the one or more datagrams corresponding to the requested media segment are currently stored within the buffer 402B. (Block 608). If the stream coordinator circuitry 304 determines the one or more datagrams are stored in the buffer 402B (Block 608: Yes), the device that sent the request has all the information needed to present the media segment and the machine-readable instructions and/or the operations 600 end.

If the one or more datagrams are not stored in the buffer 402B (Block 608: No), the stream coordinator circuitry 304 identifies which devices within the multicast environment 106 are requesting media segments of the media stream identified by the request. (Block 610). For example, suppose the request of block 602 was sent by the client device 204A and identifies media segment [30, 40) of session list 504. Suppose further that, at the time block 610 is executed, the stream coordinator circuitry 304 determines the preceding request of the smart device 208 was for media segment [10, 20) of session list 504 and the preceding request of the client device 204B was for media segment [30, 40) of session list 506. In such an example, the stream coordinator circuitry 304 identifies client device 204A as the transmitter of the request and identifies the smart device 208 as requesting the same media stream as the client device 204A at block 610. In the foregoing example, the stream coordinator circuitry 304 would not identify the client device 204B at block 610 because the last HTTP transmission of the client device 204B was from a different session list.

The stream coordinator circuitry 304 causes the UDP transceiver circuitry 308 to transmit datagram(s) corresponding to the media segment to the devices identified in block 610. (Block 612). In the foregoing example, the UDP transceiver circuitry 308 transmits datagrams corresponding to media segment [30, 40) of session list 504 to both the client device 204A and the smart device 208 at block 612. The machine readable instructions and/or operations 600 end after block 612.

FIG. 7 is a flowchart representative of example machine readable instructions and/or example operations that may be executed, instantiated, and/or performed by programmable circuitry to implement the client device or smart device of FIG. 2. In some examples, the machine readable instructions and/or operations 700 begin when the UDP transceiver circuitry 408 receives and monitors a datagram. (Block 702). Block 702 refers to a datagram that is received by one of the devices executing the operations 700 (e.g., one of the client devices 204 or the smart device 208) before the device sends a request for the datagram. In the foregoing example discussed in connection with blocks 610, 612, the datagram received by the smart device 208 in response to the first transmission is an example implementation of block 702.

The flowchart of FIG. 7 shows block 702 being implemented before blocks 704-718 for simplicity. In practice, the device implementing operations 700 may execute block 702 in parallel with blocks 704-718. Block 702 is discussed further in connection with FIG. 8.

In other examples, the machine readable instructions and/or operations 700 begin when the request former circuitry 404 produces a request for a media segment. (Block 704). In examples where the machine readable instructions and/or operations 700 begin at block 702, the request former circuitry 404 may produce the request of block 704 any amount of time after the UDP transceiver circuitry 408 receives the corresponding datagrams.

In some examples, the request former circuitry 404 forms the request of block 704 based on a command signal indicating a new media stream has been selected for presentation (e.g., the playback device 206A was tuned to a different linear television channel or live stream). In other examples, the request former circuitry 404 forms the request of block 704 based on a currently selected media stream. For example, suppose when the media player circuitry 414 caused presentation of media segment [30, 40) of session list 506, the buffer 402B only held media segment [40, 50) of session list 506. In such examples, the request former circuitry 404 may form a request for media segment [50, 60) of session list 506 so that the corresponding video data is available when the media player circuitry 414 requests it. The request may include a URL and may correspond to one or more datagrams.

The request former circuitry 404 describes the current state of the buffer 402B within a header of the request. (Block 706). The current state of the buffer may describe information including but not limited to the length of the buffer, the number of datagrams stored in the buffer, an identification of the media stream(s) corresponding to the stored datagrams, media segment length information (e.g., a range of time stamps or a number of video frames) corresponding to the stored datagrams, etc.

The request former circuitry 404 causes the HTTP transceiver circuitry 406 to transmit, using HTTP, the request to the local manager 202. (Block 708). After the transmission, the HTTP transceiver circuitry 406 receives media metadata corresponding to the request. (Block 710).

The buffer coordinator circuitry 410 determines whether the datagram(s) corresponding to the request of block 704 is currently stored in the buffer 402B. (Block 712). If the desired datagram is stored in the buffer 402B (Block 712: Yes), control proceeds to block 716.

Alternatively, if the desired datagram is not in the buffer 402B (Block 712: No), the client devices 204A, 204B or smart device 208 receives, using UDP, one or more datagrams corresponding to the request. (Block 714). The UDP transceiver circuitry 408 may receive the datagram(s) of block 714 any amount of time after the execution of block 712. The one or more datagrams are provided by the local manager 202, which obtained the portions of the media stream from a content provider via the CDN 104.

After block 714, or if the desired datagram is stored in the buffer 402B (Block 712: Yes), the media player circuitry 414 presents the media segment based on the media metadata and the desired datagram(s). (Block 716). For example, the client device 204A, 204B, or smart device 208 may recover an HTTP stream from the UDP stream by using the media metadata to list a set of datagrams in chronological order, removing the UDP headers from the set of datagrams, and combining the set of datagrams together. At block 716, the media player circuitry 414 then uses the HTTP stream to transmit video data to a playback device or a display module.

The buffer coordinator circuitry 410 updates the buffer 402B as needed. (Block 718). For example, if the datagrams used to cause presentation of a media segment were stored in the buffer 402B, the buffer coordinator circuitry 410 removes the datagrams from the buffer 402B at block 718. The machine readable instructions and/or operations 700 end after block 718.

FIG. 8 is a flowchart representative of machine readable instructions and/or operations that may be executed, instantiated, and/or performed by programmable circuitry to receive a datagram as described in connection with FIG. 7. In particular, the flowchart of FIG. 8 describes operations that are performed by the client device 204A, client device 204B, or smart device 208 at block 702 to receive a datagram before a corresponding request is formed.

Execution of block 702 begins when the UDP transceiver circuitry 408 receives, using UDP, one or more datagrams.

(Block 802). The datagram(s) are provided by the local manager 202 in response to a different device within the multicast environment 106 recently requesting media segments of the same media stream.

The buffer coordinator circuitry 410 stores the datagrams in the buffer 402B. (Block 804). In some examples, the buffer 402B is full when the buffer coordinator circuitry 410 tries to store the datagrams of block 804. In such examples, the buffer coordinator circuitry 410 may remove one or more of the oldest datagrams in the buffer 402B to free up memory and store the new datagrams of block 804. After block 804, execution of the operations 700 both return to block 704 and proceed to block 806 in parallel.

The buffer coordinator circuitry 410 determines if a threshold amount of time has passed. (Block 806). The amount of time may be a pre-determined value stored in the memory 402 and may refer to any duration. If the buffer coordinator circuitry 410 determines the threshold amount of time has not passed (Block 806: No), the client device 204A, 204B, or smart device 208 waits for a period of time (block 808) before control returns to block 806.

If the buffer coordinator circuitry 410 determines the threshold amount of time has passed (Block 806: Yes), the buffer coordinator circuitry 410 removes the datagram(s) from the buffer if still present. (Block 810). In some examples, the received datagram of block 802 is not in the buffer 402B at block 806 because it was used to present a media segment at block 716 and subsequently removed from the buffer 402B at block 718.

In other examples, the received datagram of block 802 is in the buffer 402B at block 806 because the device implementing operations 700 did not send a corresponding request to the local manager 202 (e.g., blocks 704-718 were not executed). The device may not send a corresponding request to the local manager 202 for any reason. For example, after receiving the datagram of block 702 but before producing the request of block 704, the media player circuitry 414 may receive a control signal to tune a display to a different television channel or live stream. Accordingly, the operations 700 include blocks 806-810 so that the buffer coordinator circuitry 410 can remove datagrams from the buffer that were received but not used for media presentation. The machine readable instructions and/or operations 700 end after block 810.

Figure 9:
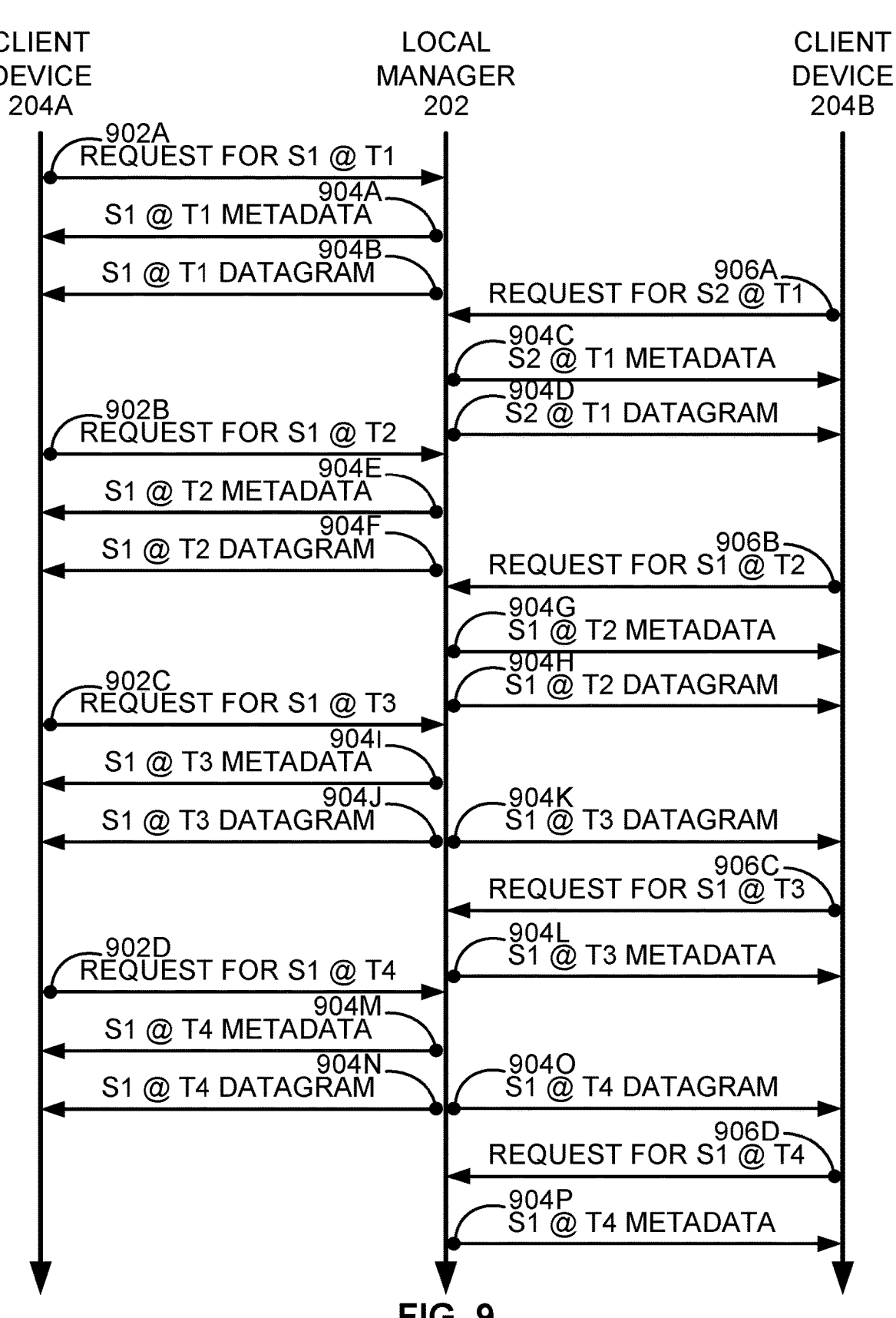
FIG. 9 is an example timing diagram of communications between the local manager and client devices of FIG. 2.

FIG. 9 is an example timing diagram of communications between the local manager 202 and client devices 204A, 204B of FIG. 2. FIG. 9 includes communications 902A, 902B, 902C, 902D, which are transmitted by the client device 204A. FIG. 9 also includes communications 904A, 904B, 904C, 904D, 904E, 904F, 904G, 904H, 904I, 904J, 904K, 904L, 904M, 904N, 904O, 904P, which are transmitted by the local manager 202. FIG. 9 also includes communications 906A, 906B, 906C, 906D, which are transmitted by the client device 204B.

The timing diagram of FIG. 9 shows communications vertically in chronological order and alphabetic order. Accordingly, unless otherwise specified, communication 902A is transmitted before 902B, communication 904A is transmitted before communication 904B, communication 906A is transmitted before communication 906B, etc.

The example of FIG. 9 begins when the client device 204A transmits communication 902A to the local manager 202 using HTTP. Communication 902A is a request for a media segment of a first time frame, T1. The media segment also corresponds to a first media stream, S1.

In response to communication 902A, the example local manager 202 transmits communications 904A and 904B to the client device 204A in any order and in substantially real time. Communication 904A, transmitted using HTTP, is media metadata corresponding to the S1 @ T1 media segment. Communication 904B, transmitted using UDP, is one or more datagrams corresponding to the S1 @ T1 media segment. Together, the communications 904A, 904B enable the client device 204A to cause presentation of the S1 @ T1 media segment.

After communication 904B and independently of previous communications, the client device 204B transmits communication 906A to the local manager 202 using HTTP. Communication 906A is a request for a media segment corresponding to a second media stream, S2. Communication 906A also corresponds to T1.

In the example of FIG. 9, client device 204B presents live media with a delay relative to client device 204A. This delay between client devices 204A, 204B is represented in FIG. 9 by the vertical distance between communications 902A, 906A.

In response to communication 906A, the example local manager 202 transmits communications 904C and 904D to the client device 204B in any order and in substantially real time. Communication 904C, transmitted using HTTP, is media metadata corresponding to the S2 @ T1 media segment. Communication 904D, transmitted using UDP, is one or more datagrams corresponding to the S2 @ T1 media segment.

After an amount of time, the client device 204A transmits communication 902B to the local manager 202 using HTTP. Communication 902B is a request for the S1 @ T2 media segment, which is the media segment chronologically adjacent to the media segment of communication 902A. In response, the local manager 202 transmits communication 904E over HTTP and communication 904F over UDP in any order and in substantially real time to provide the S1 @ T2 media metadata and S1 @ T2 datagram(s), respectively.

Between the communications 906A and 906B, the client device 204B receives instructions to switch from presentation of S2 to presentation of S1 (e.g., a user tuned to a linear television channel, selected a different live stream, etc.). Accordingly, communication 906B is a request for the S2 @ T2 media segment, which is the media segment chronologically adjacent to the media segment of communication 906A. Due to the relative delay in media presentation, the client device 204B transmits communication 906B after client device 204A transmits communication 902B.

In response to the communication 906B, the local manager 202 transmits communication 904G over HTTP and communication 904H over UDP in any order and in substantially real time to provide the S2 @ T2 media metadata and S2 @ T2 datagram(s), respectively. Upon receiving the communication 906B, the local manager 202 determines that the client devices 204 are now presenting the same media stream (S1) asynchronously.

After an amount of time, the client device 204A transmits communication 902C to the local manager 202 using HTTP. Communication 902C is a request for the S1 @ T3 media segment, which is the media segment chronologically adjacent to the media segment of communication 902B.

At the time the communication 902C is transmitted, both: (a) the client devices 204A, 204B are presenting a media stream asynchronously, and (b) neither of the client devices 204A, 204B have received media segment S1 @ T3. Accordingly, the local manager 202 transmits communications 904I, 904J, 904K, in any order and in substantially real time. The communication 904I is media metadata for S1 @ T3 that is transmitted to client device 204A via HTTP. The communications 904J, 904K are both copies of the same set of datagrams corresponding to S1 @ T3. The communications 904J, 904K are transmitted via UDP to the client devices 204A, 204B, respectively, and are an example implementation of multicasting.

Advantageously, the example local manager 202 transmits the datagrams corresponding to S1 @ T3 to the client device 204B despite not having a request from the client device 204B for said datagrams. This preemptive multicasting leverages the fact that, at the time of the multicasting, the local manager 202 client device 204A and client device 204B are currently presenting media asynchronously. Therefore, the client device 204B is likely to request the S1 @ T3 datagrams in the future. Accordingly, when the client device 204B transmits said request (i.e., the communication 906C), the local manager 202 parses the header of the request to confirm that the S1 @ T3 datagrams are already stored in the buffer 402B of the client device 204B. As a result, the local manager 202 only transmits communication 904L, the S1 @ T3 media metadata, to the client device 204B as a response to communication 906C.

After an amount of time, the example client device 204A transmits communication 902D, a request for S1 @ T4, to the local manager 202 using HTTP. The communication 902D causes the foregoing sequence of operations to repeat. That is, the example local manager 202 transmits communications 904M, 904N, 904O, in any order and in substantially real time to provide media metadata to client device 204A and to multicast the same set of datagrams to both client device 204A, 204B. The asynchronous playback results in client device 204B requesting S1 @ T4 (e.g., transmitting communication 906D) an amount of time after the transmission of 902D. Finally, the local manager 202 only transmits media metadata (e.g., communication 902B) in response to the request of client device 204B because the corresponding datagrams are already stored in the buffer 402B.

Figure 10:
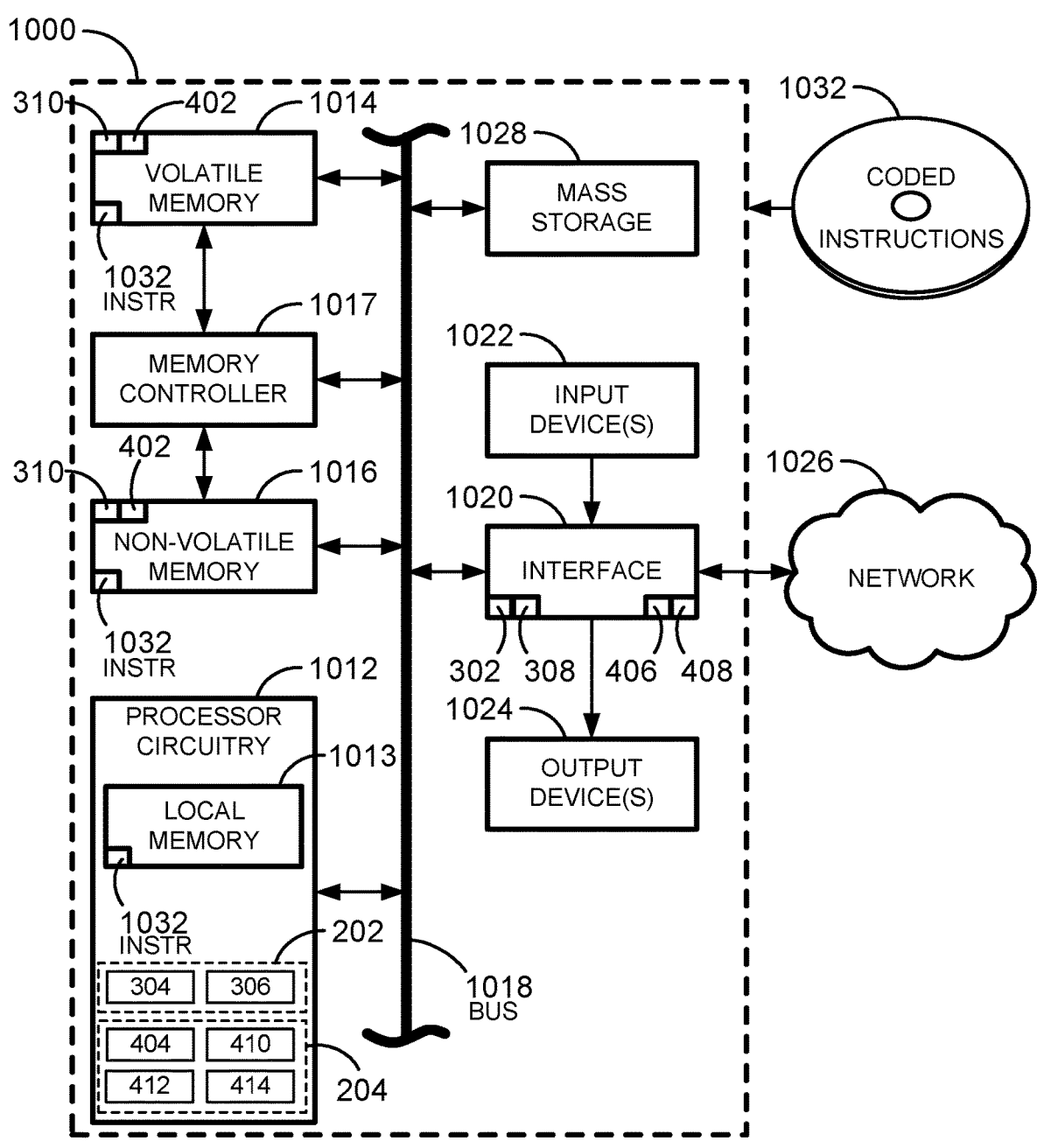
FIG. 10 is a block diagram of an example processing platform including programmable circuitry structured to execute, instantiate, and/or perform the example machine readable instructions and/or perform the example operations of FIGS. 6, 7, 8 to implement the local manager, client devices, and/or smart device of FIG. 2.

FIG. 10 is a block diagram of an example programmable circuitry platform 1000 structured to execute and/or instantiate the example machine-readable instructions and/or the example operations of FIGS. 6, 7, 8 to implement the local manager 202, client devices 204, and/or smart device 208 of FIG. 2. The programmable circuitry platform 1000 can be, for example, a set top box, a server, a personal computer, a workstation, an Internet appliance, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements example stream coordinator circuitry 304, the example stream encapsulator circuitry 306, the request former circuitry 404, the example buffer coordinator circuitry 410, the example stream decapsulator circuitry 412, and/or the example media player circuitry 414.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, and/or a voice recognition system.

One or more output devices 1024 are also connected to interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 6, 7, 8, may be stored in the mass storage device 1028, in the volatile memory 1014, in the non-volatile memory 1016, and/or on at least one non-transitory computer readable storage medium such as a CD or DVD which may be removable.

Figure 11:
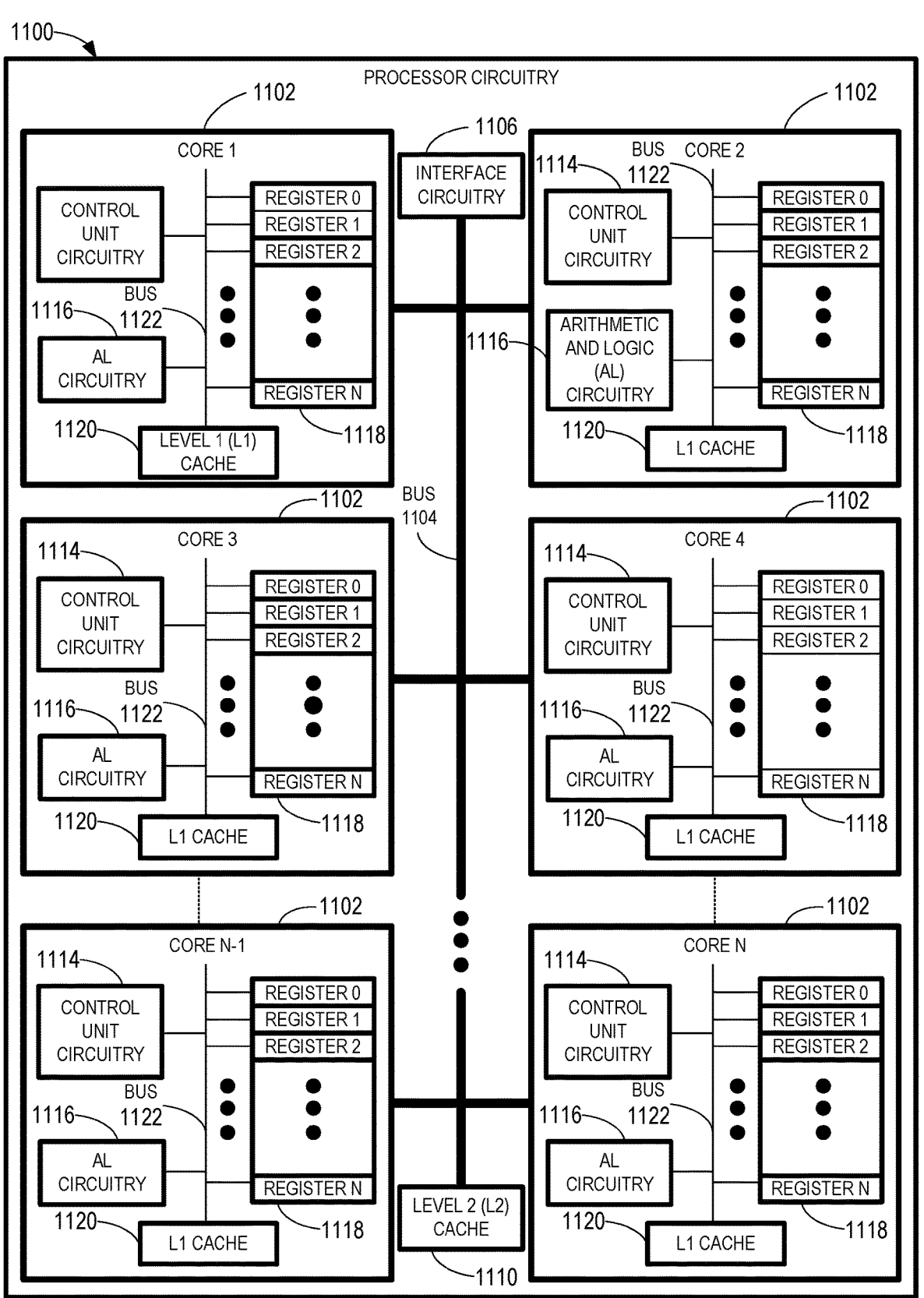
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIGS. 6, 7, 8 to effectively instantiate the circuitry of FIG. 2 as logic circuits to perform operations corresponding to those machine readable instructions. In some such examples, the circuitry of FIG. 2 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 6, 7, 8.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
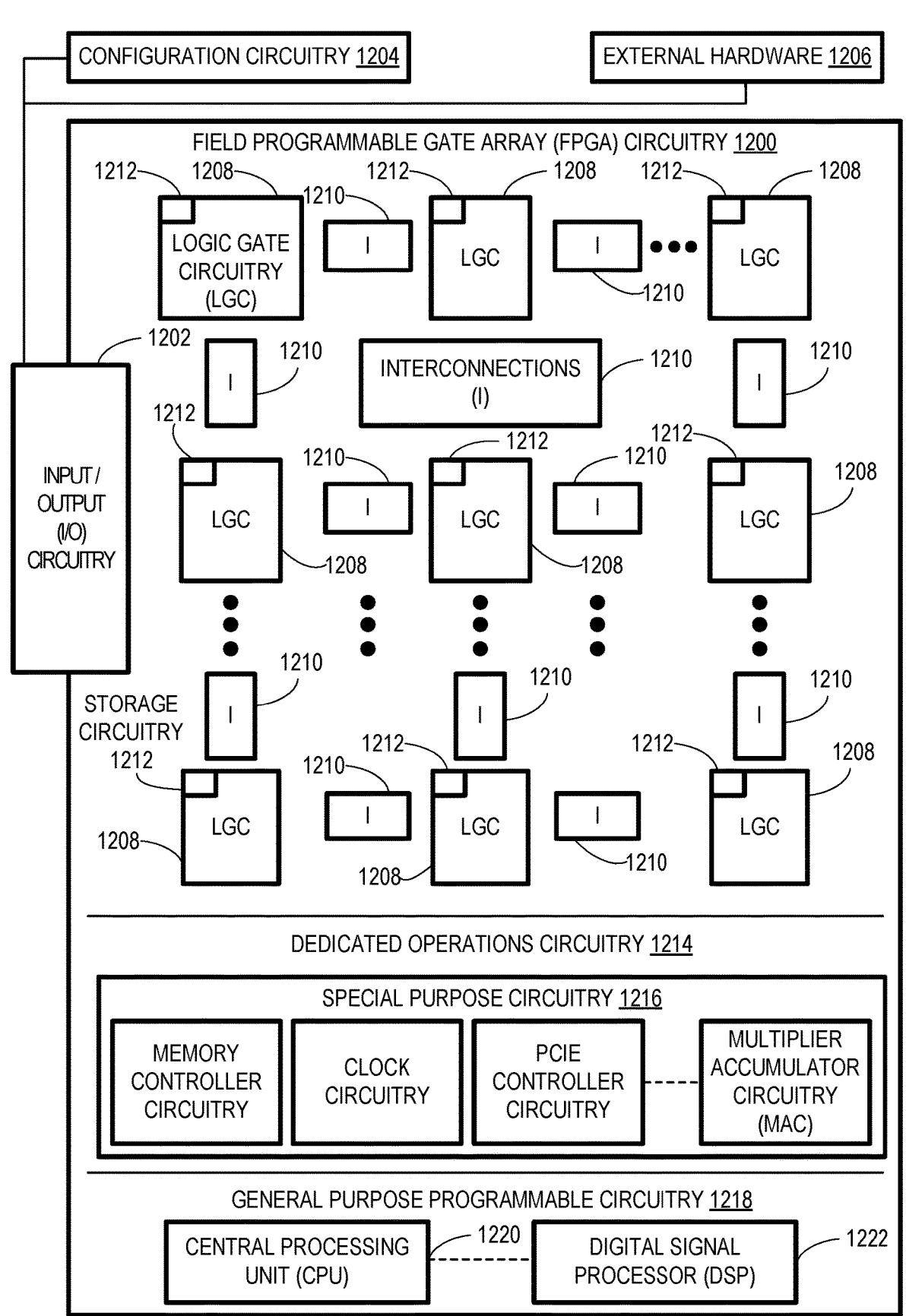
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart(s) of FIGS. 6, 7, 8 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 6, 7, 8. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6, 7, 8. As such, the FPGA circuitry 1200 may be configured and/or structured to effectively instantiate some or all of the operations/functions corresponding to the machine readable instructions of the flowchart(s) of FIGS. 6, 7, 8 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIGS. 6, 7, 8 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIGS. 6, 7, 8 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart(s) of FIGS. 6, 7, 8 to perform first operation(s)/function(s), the FPGA circuitry 1200 of FIG. 12 may be configured and/or structured to perform second operation(s)/function(s) corresponding to a second portion of the machine readable instructions represented by the flowcharts of FIG. 6, 7, 8, and/or an ASIC may be configured and/or structured to perform third operation(s)/function(s) corresponding to a third portion of the machine readable instructions represented by the flowcharts of FIGS. 6, 7, 8.

It should be understood that some or all of the circuitry of FIG. 2 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 2 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
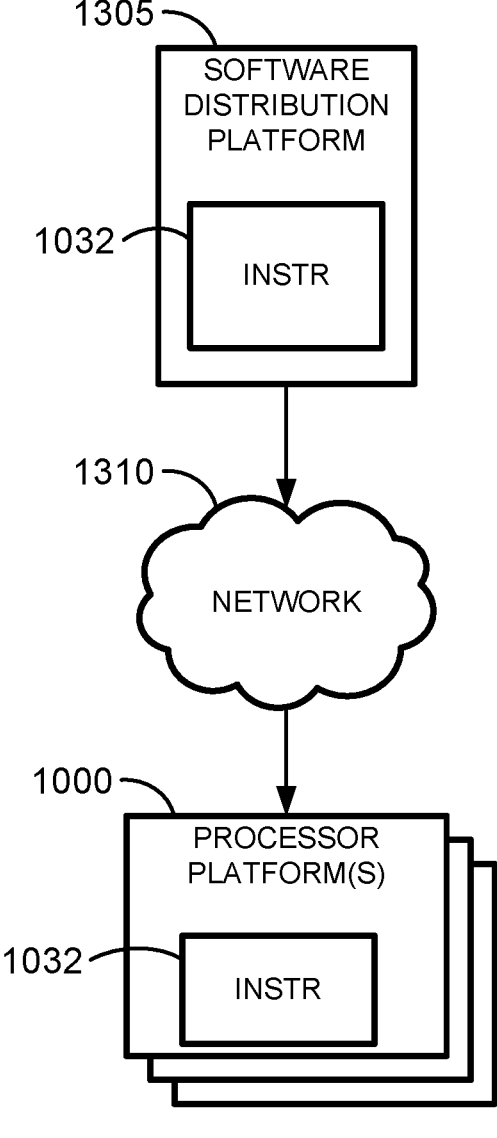
FIG. 13 is a block diagram of an example software/ firmware/instructions distribution platform (e.g., one or more servers) to distribute software, instructions, and/or firmware (e.g., corresponding to the example machine readable instructions of FIGS. 6, 7, 8) to the local managers, client devices, and/or smart devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to other hardware devices (e.g., hardware devices owned and/or operated by third parties from the owner and/or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 6, 7, 8, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIG. 6, 7, 8, may be downloaded to the example programmable circuitry platform 1000, which is to execute the machine readable instructions 1032 to implement the local manager 202, client devices 204, and/or smart device 208 of FIG. 2. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that efficiently multicast media to devices presenting the same media asynchronously. Disclosed systems, apparatus, articles of manufacture, and methods improve the efficiency of using a computing device by storing datagrams in a buffer of a client device or smart device and including a description of the buffer in the header of the request. Accordingly, when the request is received and responded to, the local manager 202 need not re-transmit a duplicate copy of datagrams that are already stored in the buffer, thereby reducing network traffic and mitigating computational resource usage. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to support asynchronous media requests are disclosed herein. Further examples and combinations thereof include the following.

Example 1 includes a system to support asynchronous media requests, the system comprising programmable circuitry, a memory that stores executable instructions that, when executed or instantiated by the programmable circuitry, facilitate performance of operations including receiving a first Hypertext Transfer Protocol (HTTP) communication from a first client device, the first HTTP communication including a first request for a media segment, in a second HTTP communication responsive to the first HTTP communication, transmitting metadata to the first client device, the metadata corresponding to the media segment, responsive to the first HTTP communication, transmitting a datagram to the first client device and to a second client device, the datagram being transmitted using User Datagram Protocol (UDP), the first client device and the second client device configured to cause presentation of a same media stream, receiving a third HTTP communication after the transmissions, the third HTTP communication including a second request for the media segment, the third HTTP communication from the second client device, and in a fourth HTTP communication responsive to the third HTTP communication, transmitting the metadata to the second client device.

Example 2 includes the system of example 1, wherein the operations further include transmitting the metadata to the first client device with a unicast protocol, and transmitting the metadata to the second client device with a unicast protocol.

Example 3 includes the system of example 1, wherein the operations further include transmitting the datagram to the first client device and the second client device with a multicast protocol.

Example 4 includes the system of example 1, wherein the second request includes a header portion to describe a state of a buffer stored in the second client device.

Example 5 includes the system of example 4, wherein the operations further include parsing the header portion from the second request, determining, using the header portion, that the datagram is stored in the buffer, and transmitting, based on the determination, the metadata but not the datagram to the second client device.

Example 6 includes the system of example 1, wherein the media segment is a portion of a linear television channel or live stream, and the first client device causes presentation of the media segment before the second client device causes presentation of the media segment.

Example 7 includes the system of example 1, wherein the media stream is a first media stream, the media segment is a portion of the first media stream, and the operations further include in response to receiving the first request for the media segment from the first client device, determining a preceding request of the second client device identifies the first media stream, in response to receiving the first request for the media segment from the first client device, determining a preceding request of a third client device identifies a second media stream, and in response to the determinations, transmitting the datagram to the first client device and second client device but not the third client device.

Example 8 includes the system of example 1, wherein the programmable circuitry includes one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to machine-readable data, and one or more registers to store a result of the one or more first operations, the machine-readable data in the memory, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations.

Example 9 includes a non-transitory machine readable storage medium comprising instructions that, when executed or instantiated by programmable circuitry, facilitate performance of operations, comprising receiving a first Hypertext Transfer Protocol (HTTP) communication from a first client device, the first HTTP communication including a first request for a media segment, in a second HTTP communication responsive to the first HTTP communication, transmitting metadata to the first client device, the metadata corresponding to the media segment, responsive to the first HTTP communication, transmitting a datagram to the first client device and to a second client device, the datagram being transmitted using User Datagram Protocol (UDP), the first client device and the second client device configured to cause presentation of a same media stream, receiving a third HTTP communication after the transmissions, the third HTTP communication including a second request for the media segment, the third HTTP communication from the second client device, and in a fourth HTTP communication responsive to the third HTTP communication, transmitting the metadata to the second client device.

Example 10 includes the non-transitory machine readable storage medium of example 9, wherein the operations further comprise transmitting the metadata to the first client device with a unicast protocol, and transmitting the metadata to the second client device with a unicast protocol.

Example 11 includes the non-transitory machine readable storage medium of example 9, wherein the operations further comprise transmitting the datagram to the first client device and the second client device with a multicast protocol.

Example 12 includes the non-transitory machine readable storage medium of example 9, wherein the second request includes a header portion to describe a state of a buffer stored in the second client device.

Example 13 includes the non-transitory machine readable storage medium of example 12, wherein the operations further comprise parsing the header portion from the second request, determining, using the header portion, that the datagram is stored in the buffer, and transmitting, based on the determination, the metadata but not the datagram to the second client device.

Example 14 includes the non-transitory machine readable storage medium of example 9, wherein the media segment is a portion of a linear television channel or live stream, and the first client device causes presentation of the media segment before the second client device causes presentation of the media segment.

Example 15 includes the non-transitory machine readable storage medium of example 9, wherein the media stream is a first media stream, the media segment is a portion of the first media stream, and the operations further comprise responsive to receiving the first request for the media segment from the first client device, determining a preceding request of the second client device identifies the first media stream, responsive to receiving the first request for the media segment from the first client device, determining a preceding request of a third client device identifies a second media stream, and responsive to the determinations, transmitting the datagram to the first client device and second client device but not the third client device.

Example 16 includes a method to support asynchronous media requests, the method comprising receiving a first Hypertext Transfer Protocol (HTTP) communication from a first client device, the first HTTP communication including a first request for a media segment, in a second HTTP communication responsive to the first HTTP communication, transmitting metadata to the first client device, the metadata corresponding to the media segment, responsive to the first HTTP communication, transmitting a datagram to the first client device and to a second client device, the datagram being transmitted using User Datagram Protocol (UDP), the first client device and the second client device configured to cause presentation of a same media stream, receiving a third HTTP communication after the transmissions, the third HTTP communication including a second request for the media segment, the third HTTP communication from the second client device, and in a fourth HTTP communication responsive to the third HTTP communication, transmitting the metadata to the second client device.

Example 17 includes the method of example 16, wherein the second request includes a header portion to describe a state of a buffer stored in the second client device.

Example 18 includes the method of example 17, further comprising parsing the header portion from the second request, determining, using the header portion, that the datagram is stored in the buffer, and transmitting, based on the determination, the metadata but not the datagram to the second client device.

Example 19 includes the method of example 16, wherein the media segment is a portion of a linear television channel or live stream, and the first client device causes presentation of the media segment before the second client device causes presentation of the media segment.

Example 20 includes the method of example 16, wherein the media stream is a first media stream, the media segment is a portion of the first media stream, and the method further comprises responsive to receiving the first request for the media segment from the first client device, determining a preceding request of the second client device identifies the first media stream, responsive to receiving the first request for the media segment from the first client device, determining a preceding request of a third client device identifies a second media stream, and responsive to the determinations, transmitting the datagram to the first client device and second client device but not the third client device.

The following claims are hereby incorporated into this Detailed Description by this reference. Although certain systems, apparatus, articles of manufacture, and methods have been disclosed herein, these are presented as illustrative examples for purposes of providing a teaching disclosure, and the scope of coverage of this patent is not limited thereto. On the contrary, this patent covers all systems, apparatus, articles of manufacture, and methods fairly falling within the scope of the claims of this patent.

What is claimed is:

1. A system of client devices, the system including a first client device comprising:

programmable circuitry;

a memory that stores executable instructions that, when executed or instantiated by the programmable circuitry, facilitate performance of operations including:

receiving a datagram using User Datagram Protocol (UDP) from a server device, the datagram including a media segment of a media stream;

after receiving the datagram, transmitting a Hypertext Transfer Protocol (HTTP) communication including a request for the media segment; and responsive to transmitting the HTTP communication, receiving metadata corresponding to the media segment from the server device.

2. The system of claim 1, wherein:

the system further includes a second client device, the operations of the first client device further include receiving the datagram after the second client device transmits a request for the media segment to the server device; and the second client device causes presentation of the media segment before the first client device causes presentation of the media segment.

3. The system of claim 2, wherein:

the operations of the first client device further include receiving the datagram with a multicast protocol; and the first client device and the second client device are to receive the datagram concurrently.

4. The system of claim 1, wherein the operations of the first client device further include receiving the metadata from the server device with a unicast protocol.

5. The system of claim 1, wherein:

the memory includes a buffer; and the operations of the first client device further include transmitting a header portion within the HTTP communication, the header portion to describe a state of the buffer.

6. The system of claim 5, wherein the operations of the first client device further include:

storing the datagram in a register of the buffer before transmitting the HTTP communication; and using the header portion of the HTTP communication to indicate the datagram is stored in the buffer.

7. The system of claim 6, wherein the received metadata includes an index corresponding to the register of the buffer storing the datagram.

8. The system of claim 1, wherein the media segment is a portion of a linear television channel or live stream.

9. The system of claim 1, wherein:

the system further includes a second client device;

the media stream is a first media stream;

the media segment is a first media segment of the first media stream;

the HTTP communication is a first HTTP communication; and the operations of the first client device further include:

transmitting a second HTTP communication, the second HTTP communication including a request for a second media segment of the first media stream, the second HTTP communication transmitted concurrently with a request from the second client device for a first media segment of a second media stream;

responsive to the second HTTP communication, receiving a datagram corresponding to the second media segment; and responsive to the second HTTP communication, receiving metadata corresponding to the second media segment.

10. A non-transitory machine readable storage medium comprising instructions to cause first programmable circuitry of a first client device to at least:

receive a datagram using User Datagram Protocol (UDP) from a server device, the datagram including a media segment of a media stream;

after receiving the datagram, transmit a Hypertext Transfer Protocol (HTTP) communication including a request for the media segment; and responsive to transmitting the HTTP communication, receive metadata corresponding to the media segment from the server device.

11. The non-transitory machine readable storage medium of claim 10, wherein the instructions are to cause second programmable circuitry of a second client device to:

transmit a request for the media segment to the server device before the first client device receives the datagram; and cause presentation of the media segment before the first client device causes presentation of the media segment.

12. The non-transitory machine readable storage medium of claim 11, wherein:

the instructions are to cause the first programmable circuitry to receive the datagram with a multicast protocol; and the first client device and the second client device are to receive the datagram concurrently.

13. The non-transitory machine readable storage medium of claim 10, wherein the instructions cause the first programmable circuitry to receive the metadata from the server device with a unicast protocol.

14. The non-transitory machine readable storage medium of claim 10, wherein:

the first client device includes a memory with a buffer; and the instructions cause the first programmable circuitry to transmit a header portion within the HTTP communication, the header portion to describe a state of the buffer.

15. The non-transitory machine readable storage medium of claim 14, wherein the instructions cause the first programmable circuitry to:

store the datagram in a register of the buffer before transmitting the HTTP communication; and use the header portion of the HTTP communication to indicate the datagram is stored in the buffer.

16. The non-transitory machine readable storage medium of claim 15, wherein the received metadata includes an index corresponding to the register of the buffer storing the datagram.

17. The non-transitory machine readable storage medium of claim 10, wherein the media segment is a portion of a linear television channel or live stream.

18. The non-transitory machine readable storage medium of claim 10, wherein:

the media stream is a first media stream;

the media segment is a first media segment of the first media stream;

the HTTP communication is a first HTTP communication; and the instructions cause the first programmable circuitry to:

transmit a second HTTP communication, the second HTTP communication including a request for a second media segment of the first media stream, the second HTTP communication transmitted concurrently with a request from a second client device for a first media segment of a second media stream;

responsive to the second HTTP communication, receiving a datagram corresponding to the second media segment; and responsive to the second HTTP communication, receiving metadata corresponding to the second media segment.

19. A method comprising:

receiving, with a first client device, a datagram using User Datagram Protocol (UDP) from a server device, the datagram including a media segment of a media stream;

after receiving the datagram, transmitting, with the first client device, a Hypertext Transfer Protocol (HTTP) communication including a request for the media segment; and responsive to transmitting the HTTP communication, receiving, with the first client device, metadata corresponding to the media segment from the server device.

20. The method of claim 19, further including:

transmitting a request, with a second client device, for the media segment from the server device;

receiving, after the second client device transmits the request, the datagram with the first client device;

presenting, with the second client device, the media segment; and presenting, with the first client device, the media segment after the second client device causes presentation.

\* \* \* \* \*